US008665265B2

(12) United States Patent
Rivera et al.

(10) Patent No.: US 8,665,265 B2
(45) Date of Patent: *Mar. 4, 2014

(54) METHODS AND SYSTEMS FOR REMOTING THREE DIMENSIONAL GRAPHICS

(71) Applicant: Citrix Systems, Inc., Fort Lauderdale, FL (US)

(72) Inventors: Juan Rivera, Doral, FL (US); Timothy J. Corbett, Coral Springs, FL (US); Julian Petrov, Pembroke Pines, FL (US)

(73) Assignee: Citrix Systems, Inc., Fort Lauderdale, FL (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/846,682

(22) Filed: Mar. 18, 2013

(65) Prior Publication Data

US 2013/0215110 A1    Aug. 22, 2013

Related U.S. Application Data

(63) Continuation of application No. 13/460,186, filed on Apr. 30, 2012, now Pat. No. 8,405,654, which is a continuation of application No. 12/360,841, filed on Jan. 27, 2009, now Pat. No. 8,169,436.

(60) Provisional application No. 61/023,867, filed on Jan. 27, 2008, provisional application No. 61/108,538, filed on Oct. 26, 2008.

(51) Int. Cl.
*G06T 15/00* (2011.01)
*G06T 1/00* (2006.01)

(52) U.S. Cl.
USPC .......................................... 345/419; 345/522

(58) Field of Classification Search
USPC .................................................. 345/419, 522
See application file for complete search history.

(56) References Cited

U.S. PATENT DOCUMENTS 4,438,511 A    3/1984    Baran
4,928,247 A    5/1990    Doyle et al.
(Continued)

FOREIGN PATENT DOCUMENTS

WO    WO-95/02236    1/1995
WO    WO-99/44121    9/1999
(Continued)

OTHER PUBLICATIONS

A. Lagar-Cavilla, N. Tolia, M. Satyanarayanan, and E. de Lara, "VMM-Independent Graphics Acceleration", Jun. 15, 2007, ACM, VEE '07 Proceedings of the 3rd International Conference on Virtual Execution Environments.
(Continued)

*Primary Examiner* — Ryan R Yang
(74) *Attorney, Agent, or Firm* — Foley & Lardner LLP; John D. Lanza

(57) ABSTRACT

Methods and systems for providing three dimensional graphics to remote computing machines and appliances that include an agent executing on a local computing machine to intercept a plurality of graphics commands generated by a three dimensional application executing on a local computing machine. A first portion of the plurality of graphics commands are encoded by the agent using a first codec, while a second portion of the plurality of graphics commands are encoded by the agent using a second codec. The agent creates a frame comprising the first portion and the second portion of the plurality of graphics commands, compresses the frame, and transmits the frame to a remote computing machine.

18 Claims, 14 Drawing Sheets

(56) References Cited

U.S. PATENT DOCUMENTS

| | | |
|---|---|---|
| 5,241,625 A | 8/1993 | Epard et al. |
| 5,432,932 A | 7/1995 | Chen et al. |
| 5,442,771 A | 8/1995 | Filepp et al. |
| 5,446,736 A | 8/1995 | Gleeson et al. |
| 5,557,765 A | 9/1996 | Lipner et al. |
| 5,572,528 A | 11/1996 | Shuen |
| 5,592,549 A | 1/1997 | Nagel et al. |
| 5,652,909 A | 7/1997 | Kodosky |
| 5,692,073 A | 11/1997 | Cass |
| 5,742,289 A * | 4/1998 | Naylor et al. ............... 345/419 |
| 5,742,797 A | 4/1998 | Celi et al. |
| 5,745,573 A | 4/1998 | Lipner et al. |
| 5,745,759 A | 4/1998 | Hayden et al. |
| 5,758,110 A | 5/1998 | Boss et al. |
| 5,819,020 A | 10/1998 | Beeler, Jr. |
| 5,832,119 A | 11/1998 | Rhoads |
| 5,838,906 A | 11/1998 | Doyle et al. |
| 5,844,553 A | 12/1998 | Hao et al. |
| 5,848,410 A | 12/1998 | Walls et al. |
| 5,860,073 A | 1/1999 | Ferrel et al. |
| 5,862,260 A | 1/1999 | Rhoads |
| 5,884,046 A | 3/1999 | Antonov |
| 5,886,707 A | 3/1999 | Berg |
| 5,887,133 A | 3/1999 | Brown et al. |
| 5,956,038 A | 9/1999 | Rekimoto |
| 5,974,547 A | 10/1999 | Klimenko |
| 5,983,190 A | 11/1999 | Trower et al. |
| 5,991,406 A | 11/1999 | Lipner et al. |
| 5,999,179 A | 12/1999 | Kekic et al. |
| 5,999,940 A | 12/1999 | Ranger |
| 6,003,030 A | 12/1999 | Kenner et al. |
| 6,011,537 A | 1/2000 | Slotznick |
| 6,023,507 A | 2/2000 | Wookey |
| 6,023,724 A | 2/2000 | Bhatia et al. |
| 6,052,120 A | 4/2000 | Nahi et al. |
| 6,101,510 A | 8/2000 | Stone et al. |
| 6,108,715 A | 8/2000 | Leach et al. |
| 6,118,521 A | 9/2000 | Jung et al. |
| 6,122,403 A | 9/2000 | Rhoads |
| 6,138,155 A | 10/2000 | Davis et al. |
| 6,141,003 A | 10/2000 | Chor et al. |
| 6,141,699 A | 10/2000 | Luzzi et al. |
| 6,170,075 B1 | 1/2001 | Schuster et al. |
| 6,173,316 B1 | 1/2001 | De Boor et al. |
| 6,185,625 B1 | 2/2001 | Tso et al. |
| 6,198,920 B1 | 3/2001 | Doviak et al. |
| 6,199,082 B1 | 3/2001 | Ferrel et al. |
| 6,201,996 B1 | 3/2001 | Crater et al. |
| 6,202,096 B1 | 3/2001 | Williams et al. |
| 6,219,669 B1 | 4/2001 | Haff et al. |
| 6,246,471 B1 | 6/2001 | Jung et al. |
| 6,246,479 B1 | 6/2001 | Jung et al. |
| 6,249,294 B1 | 6/2001 | Lefebvre et al. |
| 6,249,348 B1 | 6/2001 | Jung et al. |
| 6,253,326 B1 | 6/2001 | Lincke et al. |
| 6,263,363 B1 | 7/2001 | Rosenblatt et al. |
| 6,268,853 B1 | 7/2001 | Hoskins et al. |
| 6,271,858 B1 | 8/2001 | Dalal et al. |
| 6,272,537 B1 | 8/2001 | Kekic et al. |
| 6,272,632 B1 | 8/2001 | Carman et al. |
| 6,295,513 B1 | 9/2001 | Thackston |
| 6,314,452 B1 | 11/2001 | Dekel et al. |
| 6,317,761 B1 | 11/2001 | Landsman et al. |
| 6,317,777 B1 | 11/2001 | Skarbo et al. |
| 6,317,781 B1 | 11/2001 | De Boor et al. |
| 6,329,984 B1 | 12/2001 | Boss et al. |
| 6,330,022 B1 | 12/2001 | Seligmann |
| 6,340,977 B1 | 1/2002 | Lui et al. |
| 6,343,318 B1 | 1/2002 | Hawkins et al. |
| 6,345,239 B1 | 2/2002 | Bowman-Amuah |
| 6,356,933 B2 | 3/2002 | Mitchell et al. |
| 6,362,888 B1 | 3/2002 | Jung et al. |
| 6,373,573 B1 | 4/2002 | Jung et al. |
| 6,381,341 B1 | 4/2002 | Rhoads |
| 6,385,653 B1 | 5/2002 | Sitaraman et al. |
| 6,397,259 B1 | 5/2002 | Lincke et al. |
| 6,405,252 B1 | 6/2002 | Gupta et al. |
| 6,414,750 B2 | 7/2002 | Jung et al. |
| 6,418,324 B1 | 7/2002 | Doviak et al. |
| 6,421,726 B1 | 7/2002 | Kenner et al. |
| 6,421,738 B1 | 7/2002 | Ratan et al. |
| 6,427,132 B1 | 7/2002 | Bowman-Amuah |
| 6,442,571 B1 | 8/2002 | Haff et al. |
| 6,449,041 B1 | 9/2002 | Jung et al. |
| 6,449,639 B1 | 9/2002 | Blumberg |
| 6,459,425 B1 | 10/2002 | Holub et al. |
| 6,466,654 B1 | 10/2002 | Cooper et al. |
| 6,470,381 B2 | 10/2002 | De Boor et al. |
| 6,473,794 B1 | 10/2002 | Guheen et al. |
| 6,502,125 B1 | 12/2002 | Kenner et al. |
| 6,516,311 B1 | 2/2003 | Yacoby et al. |
| 6,519,037 B2 | 2/2003 | Jung et al. |
| 6,519,571 B1 | 2/2003 | Guheen et al. |
| 6,536,037 B1 | 3/2003 | Barrese et al. |
| 6,549,612 B2 | 4/2003 | Gifford et al. |
| 6,553,129 B1 | 4/2003 | Rhoads |
| 6,556,950 B1 | 4/2003 | Schwenke et al. |
| 6,563,505 B1 | 5/2003 | Mills et al. |
| 6,567,533 B1 | 5/2003 | Rhoads |
| 6,574,617 B1 | 6/2003 | Immerman et al. |
| 6,580,808 B2 | 6/2003 | Rhoads |
| 6,583,866 B2 | 6/2003 | Jung et al. |
| 6,590,588 B2 | 7/2003 | Lincke et al. |
| 6,590,660 B2 | 7/2003 | Jung et al. |
| 6,591,304 B1 | 7/2003 | Sitaraman et al. |
| 6,601,057 B1 | 7/2003 | Underwood et al. |
| 6,606,744 B1 | 8/2003 | Mikurak |
| 6,611,867 B1 | 8/2003 | Bowman-Amuah |
| 6,615,166 B1 | 9/2003 | Guheen et al. |
| 6,628,304 B2 | 9/2003 | Mitchell et al. |
| 6,643,652 B2 | 11/2003 | Helgeson et al. |
| 6,643,696 B2 | 11/2003 | Davis et al. |
| 6,647,128 B1 | 11/2003 | Rhoads |
| 6,647,130 B2 | 11/2003 | Rhoads |
| 6,664,969 B1 | 12/2003 | Emerson et al. |
| 6,664,978 B1 | 12/2003 | Kekic et al. |
| 6,665,706 B2 | 12/2003 | Kenner et al. |
| 6,671,818 B1 | 12/2003 | Mikurak |
| 6,675,204 B2 | 1/2004 | De Boor et al. |
| 6,681,029 B1 | 1/2004 | Rhoads |
| 6,687,745 B1 | 2/2004 | Franco et al. |
| 6,690,380 B1 | 2/2004 | Hussain et al. |
| 6,697,924 B2 | 2/2004 | Swank |
| 6,700,990 B1 | 3/2004 | Rhoads |
| 6,721,286 B1 | 4/2004 | Williams et al. |
| 6,721,713 B1 | 4/2004 | Guheen et al. |
| 6,721,747 B2 | 4/2004 | Lipkin |
| 6,725,421 B1 | 4/2004 | Boucher et al. |
| 6,735,601 B1 | 5/2004 | Subrahmanyam |
| 6,742,026 B1 | 5/2004 | Kraenzel et al. |
| 6,754,710 B1 | 6/2004 | McAlear |
| 6,757,362 B1 | 6/2004 | Cooper et al. |
| 6,760,463 B2 | 7/2004 | Rhoads |
| 6,763,040 B1 | 7/2004 | Hite et al. |
| 6,775,392 B1 | 8/2004 | Rhoads |
| 6,785,721 B1 | 8/2004 | Immerman et al. |
| 6,785,902 B1 | 8/2004 | Zigmond et al. |
| 6,788,315 B1 | 9/2004 | Kekic et al. |
| 6,789,252 B1 | 9/2004 | Burke et al. |
| 6,792,607 B1 | 9/2004 | Burd et al. |
| 6,799,221 B1 | 9/2004 | Kenner et al. |
| 6,813,366 B1 | 11/2004 | Rhoads |
| 6,816,904 B1 | 11/2004 | Ludwig et al. |
| 6,831,637 B1 | 12/2004 | Mack |
| 6,845,383 B1 | 1/2005 | Kraenzel et al. |
| 6,850,252 B1 | 2/2005 | Hoffberg |
| 6,850,893 B1 | 2/2005 | Lipkin et al. |
| 6,854,016 B1 | 2/2005 | Kraenzel et al. |
| 6,854,035 B2 | 2/2005 | Dunham et al. |
| 6,859,212 B2 | 2/2005 | Kumar et al. |
| 6,862,553 B2 | 3/2005 | Schwenke et al. |
| 6,870,616 B2 | 3/2005 | Jung et al. |
| 6,871,346 B1 | 3/2005 | Kumbalimutt et al. |
| 6,879,701 B1 | 4/2005 | Rhoads |

(56) References Cited

U.S. PATENT DOCUMENTS

| | | | |
|---|---|---|---|
| 6,880,123 | B1 | 4/2005 | Landsman et al. |
| 6,882,718 | B1 | 4/2005 | Smith |
| 6,885,920 | B2 | 4/2005 | Yakes et al. |
| 6,891,953 | B1 | 5/2005 | DeMello et al. |
| 6,892,264 | B2 | 5/2005 | Lamb |
| 6,907,118 | B2 | 6/2005 | Henderson et al. |
| 6,915,955 | B2 | 7/2005 | Jung et al. |
| 6,920,494 | B2 | 7/2005 | Heitman et al. |
| 6,928,396 | B2 | 8/2005 | Thackston |
| 6,934,578 | B2 | 8/2005 | Ramseth |
| 6,934,963 | B1 | 8/2005 | Reynolds et al. |
| 6,938,079 | B1 | 8/2005 | Anderson et al. |
| 6,950,502 | B1 | 9/2005 | Jenkins |
| 6,950,850 | B1 | 9/2005 | Leff et al. |
| 6,950,990 | B2 | 9/2005 | Rajarajan et al. |
| 6,952,698 | B2 | 10/2005 | Delaire et al. |
| 6,957,186 | B1 | 10/2005 | Guheen et al. |
| 6,965,912 | B2 | 11/2005 | Friedman et al. |
| 6,968,057 | B2 | 11/2005 | Rhoads |
| 6,970,849 | B1 | 11/2005 | DeMello et al. |
| 6,976,071 | B1 | 12/2005 | Donzis et al. |
| 6,981,262 | B1 | 12/2005 | DeMello et al. |
| 6,985,922 | B1 | 1/2006 | Bashen et al. |
| 6,987,987 | B1 | 1/2006 | Vacanti et al. |
| 6,989,822 | B2 | 1/2006 | Pettiross et al. |
| 6,993,421 | B2 | 1/2006 | Pillar et al. |
| 6,993,456 | B2 | 1/2006 | Brooks et al. |
| 6,996,670 | B2 | 2/2006 | Delaire et al. |
| 6,996,720 | B1 | 2/2006 | DeMello et al. |
| 6,996,778 | B2 | 2/2006 | Rajarajan et al. |
| 7,000,180 | B2 | 2/2006 | Balthaser |
| 7,010,512 | B1 | 3/2006 | Gillin et al. |
| 7,010,546 | B1 | 3/2006 | Kolawa et al. |
| 7,016,055 | B2 | 3/2006 | Dodge et al. |
| 7,017,189 | B1 | 3/2006 | DeMello et al. |
| 7,020,663 | B2 | 3/2006 | Hay et al. |
| 7,025,209 | B2 | 4/2006 | Hawkins |
| 7,027,055 | B2 | 4/2006 | Anderson et al. |
| 7,027,660 | B2 | 4/2006 | Hersch et al. |
| 7,027,975 | B1 | 4/2006 | Pazandak et al. |
| 7,035,427 | B2 | 4/2006 | Rhoads |
| 7,035,907 | B1 | 4/2006 | Decasper et al. |
| 7,042,454 | B1 | 5/2006 | Seligman |
| 7,047,411 | B1 | 5/2006 | DeMello et al. |
| 7,047,498 | B2 | 5/2006 | Lui et al. |
| 7,051,080 | B1 | 5/2006 | Paul et al. |
| 7,054,465 | B2 | 5/2006 | Rhoads |
| 7,054,818 | B2 | 5/2006 | Sharma et al. |
| 7,055,169 | B2 | 5/2006 | Delpuch et al. |
| 7,058,697 | B2 | 6/2006 | Rhoads |
| 7,062,527 | B1 | 6/2006 | Tyrrell, III |
| 7,064,681 | B2 | 6/2006 | Horstemeyer |
| 7,069,186 | B2 | 6/2006 | Jung et al. |
| 7,069,395 | B2 | 6/2006 | Camacho et al. |
| 7,070,098 | B1 | 7/2006 | Lapstun et al. |
| 7,072,934 | B2 | 7/2006 | Helgeson et al. |
| 7,075,643 | B2 | 7/2006 | Holub |
| 7,079,639 | B2 | 7/2006 | Smith |
| 7,080,140 | B2 | 7/2006 | Heitman et al. |
| 7,085,683 | B2 | 8/2006 | Anderson et al. |
| 7,089,583 | B2 | 8/2006 | Mehra et al. |
| 7,103,197 | B2 | 9/2006 | Rhoads |
| 7,107,285 | B2 | 9/2006 | von Kaenel et al. |
| 7,107,309 | B1 | 9/2006 | Geddes et al. |
| 7,110,982 | B2 | 9/2006 | Feldman et al. |
| 7,113,110 | B2 | 9/2006 | Horstemeyer |
| 7,113,596 | B2 | 9/2006 | Rhoads |
| 7,113,614 | B2 | 9/2006 | Rhoads |
| 7,113,779 | B1 | 9/2006 | Fujisaki |
| 7,116,781 | B2 | 10/2006 | Rhoads |
| 7,116,894 | B1 | 10/2006 | Chatterton |
| 7,117,170 | B1 | 10/2006 | Bennett et al. |
| 7,117,504 | B2 | 10/2006 | Smith et al. |
| 7,119,716 | B2 | 10/2006 | Horstemeyer |
| 7,120,872 | B2 | 10/2006 | Thacker |
| 7,124,101 | B1 | 10/2006 | Mikurak |
| 7,127,525 | B2 | 10/2006 | Coleman et al. |
| 7,130,807 | B1 | 10/2006 | Mikurak |
| 7,137,077 | B2 | 11/2006 | Iwema et al. |
| 7,137,124 | B2 | 11/2006 | Lamb et al. |
| 7,139,983 | B2 | 11/2006 | Kelts |
| 7,149,698 | B2 | 12/2006 | Guheen et al. |
| 7,152,207 | B1 | 12/2006 | Underwood et al. |
| 7,154,638 | B1 | 12/2006 | Lapstun et al. |
| 7,155,676 | B2 | 12/2006 | Land et al. |
| 7,158,953 | B1 | 1/2007 | DeMello et al. |
| 7,165,041 | B1 | 1/2007 | Guheen et al. |
| 7,171,016 | B1 | 1/2007 | Rhoads |
| 7,171,468 | B2 | 1/2007 | Yeung et al. |
| 7,171,624 | B2 | 1/2007 | Baldwin et al. |
| 7,173,538 | B2 | 2/2007 | Pedraza et al. |
| 7,174,286 | B2 | 2/2007 | Martin et al. |
| 7,177,935 | B2 | 2/2007 | Bradshaw et al. |
| 7,178,106 | B2 | 2/2007 | Lamkin et al. |
| 7,184,866 | B2 | 2/2007 | Squires et al. |
| 7,197,234 | B1 | 3/2007 | Chatterton |
| 7,197,465 | B1 | 3/2007 | Hu et al. |
| 7,199,885 | B2 | 4/2007 | Dodge et al. |
| 7,210,100 | B2 | 4/2007 | Berger et al. |
| 7,212,296 | B2 | 5/2007 | Dodge et a |
| 7,212,661 | B2 | 5/2007 | Samara et |
| 7,218,779 | B2 | 5/2007 | Dodge et al. |
| 7,219,304 | B1 | 5/2007 | Kraenzel et al. |
| 7,222,780 | B2 | 5/2007 | Lapstun et al. |
| 7,225,040 | B2 | 5/2007 | Eller et al. |
| 7,228,340 | B2 | 6/2007 | De Boor et al. |
| 7,231,357 | B1 | 6/2007 | Shanman et al. |
| 7,353,533 | B2 | 4/2008 | Wright et al. |
| 7,363,347 | B2 | 4/2008 | Thomas |
| 7,433,885 | B2 | 10/2008 | Jones |
| 7,619,623 | B2 | 11/2009 | Hoppe et al. |
| 7,647,415 | B1 | 1/2010 | Sandoz et al. |
| 7,830,388 | B1 | 11/2010 | Lu |
| 8,018,467 | B2 | 9/2011 | Solanki et al. |
| 8,054,598 | B1 | 11/2011 | Sadler et al. |
| 2001/0003193 | A1 | 6/2001 | Woodring et al. |
| 2001/0044809 | A1 | 11/2001 | Parasnis et al. |
| 2002/0033844 | A1 | 3/2002 | Levy et al. |
| 2002/0035596 | A1 | 3/2002 | Yang et al. |
| 2002/0046262 | A1 | 4/2002 | Heilig et al. |
| 2002/0049788 | A1 | 4/2002 | Lipkin et al. |
| 2002/0099738 | A1 | 7/2002 | Grant |
| 2002/0114004 | A1 | 8/2002 | Ferlitsch |
| 2002/0116582 | A1 | 8/2002 | Copeland et al. |
| 2002/0122040 | A1 | 9/2002 | Noyle |
| 2002/0178211 | A1 | 11/2002 | Singhal et al. |
| 2002/0184224 | A1 | 12/2002 | Haff et al. |
| 2002/0196254 | A1 | 12/2002 | Suzuki et al. |
| 2003/0001849 | A1 | 1/2003 | Devins et al. |
| 2003/0001854 | A1 | 1/2003 | Jade et al. |
| 2003/0055883 | A1 | 3/2003 | Wiles, Jr. |
| 2003/0055896 | A1 | 3/2003 | Hu et al. |
| 2003/0079224 | A1 | 4/2003 | Komar et al. |
| 2003/0101292 | A1 | 5/2003 | Fisher et al. |
| 2003/0107578 | A1 | 6/2003 | Willis et al. |
| 2003/0182375 | A1 | 9/2003 | Zhu et al. |
| 2003/0191799 | A1 | 10/2003 | Araujo et al. |
| 2003/0212760 | A1 | 11/2003 | Chen et al. |
| 2003/0229718 | A1 | 12/2003 | Tock et al. |
| 2004/0010601 | A1 | 1/2004 | Afergan et al. |
| 2004/0015478 | A1 | 1/2004 | Pauly |
| 2004/0031058 | A1 | 2/2004 | Reisman |
| 2004/0034697 | A1 | 2/2004 | Fairhurst et al. |
| 2004/0039827 | A1 | 2/2004 | Thomas et al. |
| 2004/0049515 | A1 | 3/2004 | Haff et al. |
| 2004/0073630 | A1 | 4/2004 | Copeland et al. |
| 2004/0078621 | A1 | 4/2004 | Talaugon et al. |
| 2004/0130550 | A1 | 7/2004 | Blanco et al. |
| 2004/0163001 | A1 | 8/2004 | Bodas |
| 2004/0189669 | A1 | 9/2004 | David et al. |
| 2004/0199575 | A1 | 10/2004 | Geller |
| 2004/0267952 | A1 | 12/2004 | He et al. |
| 2005/0091302 | A1 | 4/2005 | Soin et al. |
| 2005/0097008 | A1 | 5/2005 | Ehring et al. |

(56) References Cited

U.S. PATENT DOCUMENTS

| | | |
|---|---|---|
| 2005/0149726 A1 | 7/2005 | Joshi et al. |
| 2005/0154699 A1 | 7/2005 | Lipkin et al. |
| 2005/0165906 A1 | 7/2005 | Deo et al. |
| 2005/0193075 A1 | 9/2005 | Haff et al. |
| 2005/0193396 A1 | 9/2005 | Stafford-Fraser et al. |
| 2005/0197977 A1 | 9/2005 | Buck et al. |
| 2005/0256923 A1 | 11/2005 | Adachi |
| 2006/0041635 A1 | 2/2006 | Alexander et al. |
| 2006/0082591 A1 | 4/2006 | Emerson et al. |
| 2006/0095538 A1 | 5/2006 | Rehman et al. |
| 2006/0103665 A1 | 5/2006 | Opala et al. |
| 2006/0109266 A1* | 5/2006 | Itkowitz et al. ............... 345/419 |
| 2006/0161671 A1 | 7/2006 | Ryman et al. |
| 2006/0161959 A1 | 7/2006 | Ryman et al. |
| 2006/0203007 A1 | 9/2006 | Bullard et al. |
| 2006/0206931 A1 | 9/2006 | Dillaway et al. |
| 2006/0274828 A1 | 12/2006 | Siemens et al. |
| 2007/0057943 A1 | 3/2007 | Beda et al. |
| 2007/0088792 A1 | 4/2007 | Piper et al. |
| 2007/0106681 A1 | 5/2007 | Haot et al. |
| 2007/0211065 A1 | 9/2007 | Feth et al. |
| 2007/0250838 A1 | 10/2007 | Belady et al. |
| 2008/0022054 A1 | 1/2008 | Hertzberg et al. |
| 2008/0114997 A1 | 5/2008 | Chin |
| 2008/0198167 A1 | 8/2008 | Bakalash et al. |
| 2008/0235320 A1 | 9/2008 | Joy et al. |
| 2008/0246772 A1 | 10/2008 | Bakalash et al. |
| 2009/0044036 A1 | 2/2009 | Merkin |
| 2009/0102838 A1 | 4/2009 | Bullard et al. |
| 2009/0106571 A1 | 4/2009 | Low et al. |
| 2009/0125737 A1 | 5/2009 | Brey et al. |
| 2009/0189892 A1 | 7/2009 | Desai et al. |
| 2009/0231152 A1 | 9/2009 | Tung et al. |
| 2009/0234512 A1 | 9/2009 | Ewing et al. |
| 2009/0265568 A1 | 10/2009 | Jackson |
| 2010/0010857 A1 | 1/2010 | Fadell |
| 2010/0205469 A1 | 8/2010 | McCarthy et al. |
| 2011/0010566 A1 | 1/2011 | Bandholz et al. |
| 2011/0102443 A1 | 5/2011 | Dror et al. |

FOREIGN PATENT DOCUMENTS

| | | | |
|---|---|---|---|
| WO | WO 03/075116 | * | 9/2003 |
| WO | WO-03/075116 | | 9/2003 |
| WO | WO-2005/114375 | | 12/2005 |

OTHER PUBLICATIONS

Athanassios Skodras, Charilaos Christopoulos, Touradj Ebrahimi, "The JPEG 2000 Still Image Compression Standard", Sep. 2001, IEEE, Signal Processing Magazine, vol. 18, Issue 5, pp. 36-58.

Buck, G. Humphreys, P. Hanrahan, "Tracking Graphics State for Networked Rendering", Aug. 22, 2000, ACM, HWWS '00 Proceedings of the ACM SIGGRAPH/EUROgraphics workshop on Graphics hardware, pp. 87-95.

Chinese Office Action on 200980101124.6 dated Feb. 20, 2013.

Chinese Office Action on 200980101124.6 dated Jul. 11, 2012.

Edward Angel, "Interactive Computer Graphics: A Top-Down Approach Using OpenGL", 2003, Addison-Wesley, 3rd Edition, pp. 44,66.

European Search Report on 10190906.7 dated Apr. 4, 2011.

European Search Report on 10190907.5 dated Apr. 4, 2011.

European Search Report on 10190909.1 dated Apr. 7, 2011.

European Search Report on 10190910.9 dated Apr. 4, 2011.

G. Humphreys, M. Eldridge, I. Buck, G. Stoll, M. Everett, P. Hanrahan, "WireGL: A Scalable Graphics System for Clusters", Aug. 17, 2001, ACM, SIGGRAPH '01 Proceedings of the 28th annual conference on Computer graphics and interactive techniques, pp. 129-140.

G. Humphreys, M. Eldridge, I. Buck, P. Hanrahan, "Distributed Rendering for Scalable Displays", Nov. 10, 2000, IEEE, Supercomputing '00 Proceedings of the 2000 ACM/IEEE conference on Supercomputing (CDROM) Article No. 30.

International Search Report for International Application No. PCT/US2009/032173, Filed Jan. 27, 2009. Completed Jul. 23, 2009. Mailed Aug. 11, 2009. 7 pages.

Notice of Allowance on U.S. Appl. No. 12/360,838 dated Oct. 10, 2012.

Notice of Allowance on U.S. Appl. No. 12/360,841 dated Feb. 17, 2012.

Notice of Allowance on U.S. Appl. No. 13/460,186 dated Nov. 26, 2012.

Office Action on U.S. Appl. No. 12/360,838 dated Oct. 5, 2011.

Office Action on U.S. Appl. No. 12/360,838 dated Apr. 24, 2012.

Office Action on U.S. Appl. No. 12/360,841 dated Oct. 21, 2011.

Office Action on U.S. Appl. No. 12/360,842 dated Jan. 16, 2013.

Office Action on U.S. Appl. No. 12/360,842 dated Oct. 17, 2011.

Office Action on U.S. Appl. No. 12/360,842 dated Mar. 5, 2012.

Office Action on U.S. Appl. No. 12/360,842 dated Aug. 24, 2012.

Office Action on U.S. Appl. No. 12/360,842 dated Sep. 5, 2013.

Office Action on U.S. Appl. No. 12/360,843 dated Jan. 24, 2013.

Office Action on U.S. Appl. No. 12/360,843 dated Nov. 4, 2011.

Office Action on U.S. Appl. No. 12/360,843 dated Apr. 16, 2012.

Office Action on U.S. Appl. No. 12/360,843 dated Sep. 26, 2012.

Office Action on U.S. Appl. No. 12/360,844 dated Nov. 28, 2011.

Office Action on U.S. Appl. No. 12/360,844 dated Mar. 14, 2012.

Office Action on U.S. Appl. No. 12/360,844 dated Mar. 18, 2013.

Office Action on U.S. Appl. No. 12/360,844 dated Jul. 3, 2013.

Office Action on U.S. Appl. No. 13/460,186 dated Jul. 12, 2012.

Written Opinion of the International Searching Authority for International Application No. PCT/US2009/032173, Filed Jan. 27, 2009. Completed Jul. 23, 2009. Mailed Aug. 11, 2009. 23 Pages.

* cited by examiner

METHODS AND SYSTEMS FOR REMOTING THREE DIMENSIONAL GRAPHICS

This U.S. Patent Application is a continuation of U.S. application Ser. No. 13/460,186, filed on Apr. 30, 2012, now issued as U.S. Pat. No. 8,405,654 which is a continuation of U.S. application Ser. No. 12/360,841, filed on Jan. 27, 2009, now issued as U.S. Pat. No. 8,169,436, which claims priority to U.S. Provisional Patent Application Ser. No. 61/023,867, filed on Jan. 27, 2008; and claims priority to U.S. Provisional Patent Application Ser. No. 61/108,538, filed on Oct. 26, 2008. The disclosures of these prior applications are considered part of the disclosure of this application and are incorporated herein by reference in each of their entirety.

FIELD OF THE INVENTION

This invention relates generally to remotely providing graphics. More specifically, this invention relates to remotely providing three-dimensional graphics.

BACKGROUND OF THE INVENTION

Remote delivery systems that remotely provide applications or desktops having enhanced graphics requirements such as those applications and desktops that employ three-dimensional graphics; can experience end-user-experience degradation due to said enhanced graphics requirements. For example, when delivering a desktop or application that uses three-dimensional graphics to an end-user of Citrix's XenApp, XenDesktop or XenServer, the end-user may be provided with an end-user experience of lesser quality. Mitigating this quality degradation caused by the three-dimensional graphics can in some embodiments be accomplished by altering the way in which desktops and applications are remotely provided to end-users.

There currently exists various different methods and systems for remotely providing two-dimensional graphics. For example, such methods and systems typically accomplish the remote presentation of two dimensional graphics by: rendering graphics on one computing machine and transmitting the rendered graphical content to another computing machine; determining when rendered graphics are stored on a remote computing machine, rendering only those graphics not stored on the remote computing machine and transmitting the newly rendered graphics to the remote computing machine. The methods and systems for remotely providing two-dimensional graphics that currently exist, do not take into consideration the enhanced graphics requirements of three-dimensional graphics. Such enhanced graphics requirements can include the increased computing resources needed to both render and transmit three-dimensional graphics, the complexity of rendering a two-dimensional representation of a three-dimensional image, and other such requirements.

What is needed are methods and systems for remotely providing three-dimensional graphics and other such graphics that have enhanced graphics requirements beyond those needed to render two-dimensional graphics. These methods and systems would additionally reduce the quality degradation caused by remotely providing three-dimensional graphics because these methods and systems would provide the additional graphics requirements needed to successfully remote three-dimensional graphics without degrading the quality of the remotely provided application or desktop.

SUMMARY OF THE INVENTION

In its broadest interpretation, this disclosure describes methods and systems for remoting three-dimensional graphics. Remoting two dimensional graphics often does not take into consideration the enhanced graphics requirements needed by three-dimensional images and therefore may not adequately remote three-dimensional graphics. The present disclosure describes methods and systems for remoting three-dimensional graphics that interface with three-dimensional graphics technologies such that they efficiently handle the multiple graphics components associated with the three-dimensional graphics, that were not associated with two dimensional graphics.

In one aspect, a method for remoting three-dimensional graphics includes intercepting, by an agent, a plurality of graphics commands generated by a three-dimensional application executing on a local computing machine. The method includes encoding, by the agent, a first portion of the plurality of graphics commands with a first codec. The method includes encoding, by the agent, a second portion of the plurality of graphics commands with a second codec. The method includes creating, by the agent, a frame comprising the first portion and the second portion of the plurality of graphics commands. The method includes compressing the frame by the agent. The method includes transmitting, by the agent, the frame to a remote computing machine.

In one embodiment, the method includes encoding a first portion of the plurality of graphics commands comprising one of vertex graphics commands, index graphics commands, and texture graphics commands. In another embodiment, the method includes encoding a second portion of the plurality of graphics commands comprising one of vertex graphics commands, index graphics commands, and texture graphics commands. In still another embodiment, the method includes encoding a second portion of the plurality of graphics commands different from the first portion of the plurality of graphics commands. In yet another embodiment, the method includes encoding a second portion of the plurality of graphics commands substantially similar to the first portion of the plurality of graphics commands.

In one embodiment, the method includes intercepting the graphics commands before they are transmitted to a three-dimensional graphics driver. In another embodiment, the method includes redirecting the graphics commands to a proxy three-dimensional graphics driver. In still another embodiment, the method includes creating a frame further comprises creating a frame comprising graphics primitives. In still even another embodiment, the method includes creating a frame further comprises creating a frame comprising DirectX graphics primitives. In still even another embodiment, the method includes creating a frame further comprises creating a frame comprising OpenGL graphics primitives. In still another embodiment, the method includes creating a frame further comprises creating a frame comprising Direct3D graphics primitives.

In another aspect, a system for remoting three-dimensional graphics includes a local computing machine, a remote computing machine, and an agent executing on the local computing machine. The local computing machine executes a three-dimensional application that generates a plurality graphics commands. The remote computing machine is in communication with the local computing machine via a remote presentation protocol. The agent intercepts the plurality of graphics commands. The agent encodes a first portion of the plurality of graphics commands with a first codec. The agent encodes a second portion of the plurality of graphics commands with a second codec. The agent creates a frame comprising the first portion and the second portion of the plurality of graphics commands. The agent compresses the frame. The agent transmits the frame to the remote computing machine.

Taken another way in its broadest interpretation, this disclosure describes methods and systems for rendering three-dimensional graphical data. Graphics command remoting of three-dimensional graphics can be taxing on a local computing device's central processing unit and on network resources. Similarly, bitmap remoting of three-dimensional graphics can also be taxing on a local computing device's central processing unit and on network resources. The present disclosure describes methods and systems for rendering three-dimensional applications either locally or remotely on a transactional or application basis. The hybrid rendering scheme carried out by the present disclosure can alleviate the stress placed on a system by command and bitmap remoting by spreading out the rendering requests over a local and remote computing machine.

In one aspect, a method for rendering three-dimensional graphical data includes intercepting a three-dimensional graphics stream comprising three-dimensional graphics commands generated by an application executing on a first computing machine. The method includes analyzing characteristics of a remoting system to determine a location for rendering three-dimensional data from the three-dimensional graphics commands, the remoting system comprising at least the first computing machine having a graphics rendering component, a second computing machine having a graphics rendering component and a network. The method includes determining a rendering location based on the remoting system analysis. The method includes inducing the application to reinitialize a context for determining where to render three-dimensional data. The method includes rendering three-dimensional data from the three-dimensional graphics commands at the rendering location, responsive to the inducement.

In one embodiment, the method includes inducing a reinitialization of the context by reporting a device state, associated with a device, to the application. In another embodiment, the method includes reporting a device state indicating that the device is removed. In still another embodiment, the method includes analyzing characteristics associated with any of an available bandwidth on the network, a load placed on the first computing machine graphics rendering component, a load placed on the second computing machine graphics rendering component, the application, and the three-dimensional graphics commands. In still even another embodiment, the method includes analyzing characteristics associated with any of an available bandwidth on the network, a load placed on the first computing machine graphics rendering component, a load placed on the second computing machine graphics rendering component, the application, and the three-dimensional graphics commands. In yet another embodiment the method includes analyzing characteristics associated with any of an available bandwidth on the network, a load placed on the first computing machine graphics rendering component, a load placed on the second computing machine graphics rendering component, the application, and the three-dimensional graphics commands.

In one embodiment, the method includes intercepting a three-dimensional graphics stream comprising three-dimensional graphics commands and rendered graphics. In another embodiment, the method includes determining the rendering location for rendering the three-dimensional data is the first computing machine. In still another embodiment, the method includes inducing the application to reinitialize the context to specify the first computing machine as the rendering location; rendering, on the first computing machine, the three-dimensional data; and transmitting to the second computing machine the rendered three-dimensional data. In yet another embodiment, the method includes determining the rendering location for rendering the three-dimensional data is the second computing machine.

In one embodiment, the method includes inducing the application to reinitialize the context to specify the second computing machine as the rendering location; transmitting the three-dimensional graphics stream to the second computing machine; and rendering, on the second computing machine, the three-dimensional data. In another embodiment, the method includes determining to render a first portion of the three-dimensional data on the first computing machine; inducing the application to reinitialize the context to specify the first computing machine as the rendering location for the first portion of the three-dimensional data; rendering the first portion of three-dimensional data on the first computing machine; and storing, on the first computing machine, the rendered first portion of three-dimensional data as shared resources. In still another embodiment, the method includes intercepting the three-dimensional graphics stream comprising three-dimensional graphics commands and the shared resources; determining to render the three-dimensional data on the second computing machine; inducing the application to reinitialize the context to specify the second computing machine as the rendering location; transmitting the three-dimensional graphics stream to the second computing machine; and rendering, on the second computing machine, the three-dimensional data from the three-dimensional graphics commands.

In another aspect, a system for rendering three-dimensional graphical data includes a first computing machine, a second computing machine, a remoting system, and a rendering agent. The first computing machine executes an application that generates three-dimensional graphics commands. The first computing machine has a graphics rendering component. The second computing machine, in communication with the first computing machine via a network, has a graphics rendering component. The remoting system includes the first computing machine, the second computing machine and the network. The rendering agent executes on the first computing machine and intercepts a three-dimensional graphics stream comprising the three-dimensional graphics commands. The rendering agent analyzes characteristics of the remoting system to determine a location for rendering three-dimensional data from the three-dimensional graphics commands. The rendering agent determines a rendering location based on the remoting system analysis. The rendering agent induces the application to reinitialize a context for determining where to render three-dimensional data.

In one embodiment, the rendering agent includes means for inducing the reinitialization of the context by reporting a device state, associated with a device, to the application. In another embodiment, the rendering agent includes means for reporting a device state that indicates the device is removed.

In another broad interpretation, this disclosure describes methods and systems for computing a hash from a three-dimensional data set loaded into a three-dimensional resource where the three-dimensional data set has a variable size. In most applications little thought is given as to whether graphical processing unit resources are conservatively used by applications. For example, many applications load resources directly into a driver during the production of each frame. Many of these frames are synthetically generated by a looping graphics engine in the application, therefore there can be quite a bit of redundancy with regard to the graphics content of co-joining frames or frames that are only a few frames apart. The present disclosure describes methods and systems for mitigating such redundancy by advantageously using the transactional nature of loading resources into a three-dimensional resource to compute a hash on data generated during the transaction. By caching based on a data set created during a transaction, rather than a byte stream, repetitious data resulting from repetitious transactions can be thrown out prior to compression. What results is a efficient compression of the three-dimensional data loaded into the resource free of repetitions.

In one aspect, described is a method for computing a hash from a three-dimensional data set loaded into a three-dimensional resource, the three-dimensional data set having a variable size. A determination is first made as to whether an application, executing in a distributed computing environment, locked a three-dimensional resource. An identification is then made of a first three-dimensional data set loaded into the three-dimensional resource by the application, the first three-dimensional data set having a size determined in part by a transaction carried out by the application. The method further comprises detecting the application performed an operation on the three-dimensional resource, computing a first hash on the loaded first set of three-dimensional data, the first hash computed using a hash function, and storing the first hash in a repository.

In one embodiment, the method further comprises eliminating a portion of the first three-dimensional data set responsive to detecting the application performed an operation, the portion of the three-dimensional data set resulting from a repetitious transaction.

Other embodiments include determining the application locked a three-dimensional resource used by the application. While still other embodiments include computing the has function using an adler-32 hash function.

In one embodiment, the three-dimensional resource is one of either of a vertex, index, shade, texture, and surface. Other embodiments include identifying the first three-dimensional data set further comprises identifying a first three-dimensional data set having a size determined in part by a transaction carried out by the application, the transaction comprising at least copying three-dimensional data into the three-dimensional resource. In such an embodiment, the transaction further comprises an end event comprising at least unlocking the three-dimensional resource. Still other embodiments include identifying the second three-dimensional data set further comprises identifying a second three-dimensional data set having a size determined in part by a transaction carried out by the application, the transaction comprising at least copying three-dimensional data into the three-dimensional resource. In such embodiments, the transaction further comprises an end event comprising at least unlocking the three-dimensional resource.

In still another embodiment, the first three-dimensional data set has a size determined in part by a transaction carried out by the application, the size representative in part of a period of time spanning from a start event to an end event. The start event, in one embodiment, further comprises locking the three-dimensional resource. The end event, in one embodiment, further comprises unlocking the three-dimensional resource.

In one embodiment, the first hash is a cache.

Still other embodiments include a method further comprising identifying a second three-dimensional data set loaded into the three-dimensional resource by the application, the second three-dimensional data set having a size different from the size of the first three-dimensional data set. The method also includes detecting the application performed an operation on the three-dimensional resource, computing a second hash on the loaded second set of three-dimensional data, the second hash computed using the hash function, and storing the second hash in a repository. In another embodiment, the second hash is a cache. Still another embodiment includes a method further comprising identifying the second three-dimensional data set further comprises identifying a second three-dimensional data set having a size determined in part by a transaction carried out by the application, the size representative in part of a period of time spanning from a start event to an end event. The start event can, in some embodiments, comprise locking the three-dimensional resource, while the end event can, in some embodiments, comprise unlocking the three-dimensional resource.

In yet another broad interpretation, this disclosure describes methods and systems for detecting dirty regions within a frame encompassing three-dimensional graphics and three-dimensional graphics primitives. A particular three-dimensional graphic is, in many cases, transmitted from a local computing machine to a remote computing machine once the bitmap rendered and saved to a back buffer is displayed by flipping the contents of the back buffer so that a front buffer can access the rendered image and display it on the screen. To remotely provide a three-dimensional graphic, one would wait until the rendered three-dimensional graphic is displayed on the screen and then transmit the new bitmap to the remote computing machine. This can be a resource intensive process that requires a lot of bandwidth. The present disclosure describes methods and systems that can review the rendered three-dimensional graphics before they are flipped to the front buffer for display on the screen. Reviewing the rendered image before it is flipped to the front buffer allows for a determination to be made as to what sections of the bitmap were changed. This further allows for the extraction of changed or dirty regions such that only those regions are transmitted to the remote computing machine. Transmitting only sections of the rendered three-dimensional graphic reduces the amount of bandwidth needed to transmit the graphic over a network.

In one aspect, described is an embodiment of a method for detecting a dirty region within a frame encompassing three-dimensional graphics and three-dimensional graphics primitives. An agent executing on a local computing machine, intercepts a function call issued by an application generating three-dimensional graphics. The agent further identifies, responsive to intercepting the function call, at least one location within a frame containing three-dimensional graphics commands generated by the application, the location corresponding to a drawing region. The agent further determines at least a portion of the three-dimensional graphics commands, associated with the at least one location within the frame, changed. Further the agent extracts the changed portion of the three-dimensional graphics commands.

In one embodiment, the function call comprises a call to set a drawing region, where a drawing region can in some embodiments be a drawing region on a display device.

Other embodiments include a method where the three-dimensional graphical data is rendered to a buffer. The function call, in some embodiments, can include a call to display contents of the buffer.

In another embodiment, the frame comprises a three-dimensional graphics library, while in other embodiments the at least one location further comprises identifying at least one viewport.

Some embodiments include an agent that further identifies a plurality of locations within a frame, each location containing three-dimensional graphics commands generated by the application, the locations corresponding to a drawing regions. After identifying the plurality of locations, the agent determines portions of the three-dimensional graphics commands, associated with the plurality of locations within the frame, changed. The agent further extracts the changed portions of the three-dimensional graphics commands from the plurality of drawing region, and transmits the changed portions to a remote computing machine communicating with the local computing machine.

In yet another embodiment the method further comprises transmitting the changed portion to a remote computing machine communicating with the local computing machine.

Other aspects describe a system for detecting a dirty region within a frame encompassing three-dimensional graphics and three-dimensional graphics primitives that includes a local computing machine executing an application generating three-dimensional graphics, and issuing at least one function call. The system further comprises an agent executing on the local computing machine to: intercept the issued at least one function call; identify, responsive to intercepting the function call, at least one location within a frame containing three-dimensional graphics commands generated by the application, the location corresponding to a drawing region; determine at least a portion of the three-dimensional graphics commands, associated with the at least one location within the frame, changed; and extract the changed portion of the three-dimensional graphics commands.

Still other aspects describe a computer readable medium having instructions executable by a processor to detect a dirty region within a frame encompassing three-dimensional graphics and three-dimensional graphics primitives. The computer readable medium further comprising instructions to intercept, via an agent executing on a local computing machine, a function call issued by an application generating three-dimensional graphics. Also included are instructions to identify, by the agent and responsive to intercepting the function call, at least one location within a frame containing three-dimensional graphics commands generated by the application, the location corresponding to a drawing region. The computer readable medium further includes instructions to determine at least a portion of the three-dimensional graphics commands, associated with the at least one location within the frame, changed; and instructions to extract the changed portion of the three-dimensional graphics commands.

In still yet another broad interpretation, this disclosure describes methods and systems for improving resource utilization when remoting three-dimensional graphics commands generated by an application executing on a local computing machine. In some cases, remoting a two dimensional or three-dimensional application requires the rendering of all frames as received from the application and at a standard speed, then transmitting the rendered frames to a remote computing machine. Systems and methods that utilize this process may find that the network installed between the remote computing machine and local computing machine is insufficient to transmit data at the same speed as the speed at which the data is rendered. The present disclosure describes methods and systems that can prevent the rendering of three-dimensional graphics until the previous frame is received by the remote computing device. Thus, the local computing device only renders frames once previous frames have been received by the remote computing device.

In one aspect, described herein is an embodiment of a method for improving resource utilization when remoting three-dimensional graphics commands generated by an application executing on a local computing machine. This method can include intercepting, by an agent executing on a local computing machine, a first call to a drawing library, the first call generated by an application requesting information from the drawing library. The agent then transmits the first frame, generated by the application, to a remote computing machine, and further prevents, upon failing to receive a notification indicating the first frame was rendered, a return of the first call to the requesting application. Once the agent receives a notification generated by the remote computing machine and indicating the first frame was rendered, the agent permits the return of the first call to the requesting application.

In one embodiment, the first call is a present call requesting to exchange a currently displayed image with an image rendered from the first frame. Still other embodiments include preventing the return of the first call for a predetermined period of time. The first frame, in some embodiments, comprises three-dimensional graphics commands generated by the application.

Other embodiments include a drawing library that is a DirectX library, while other embodiments include a drawing library that is an OpenGL library.

Some embodiments include receiving a notification that a notification that no further data can be transmitted over a network used by the local computing machine to communicate with the remote computing machine, and determining based on that information that the network is busy.

Other embodiments include a method further comprising transmitting, by the agent, a second frame generated by the application. The agent receives a notification indicating the second frame was rendered, and intercepts a second call generated by the application requesting information from the drawing library. The agent then identifies an indicator that the second frame was rendered, and permits the second call to return to the requesting application.

In other aspects, a system for improving resource utilization when remoting three-dimensional graphics commands generated by an application executing on a local computing machine. The system includes a local computing machine that executes an application which generates a first frame, and generates a first call to a drawing library to request information from the drawing library. Also included in an agent executing on the local computing machine to do the following: intercept the first call to the drawing library; transmit the first frame to a remote computing machine; prevent, upon failing to receive notification indicating the first frame was rendered, a return of the first call to the requesting application; receive a notification, generated by the remote computing machine, indicating that the first frame was rendered; and permit the return of the first call to the requesting application.

Still other aspects include a computer readable medium having instructions executable by a processor to improve resource utilization when remoting three-dimensional graphics commands generated by an application executing on a local computing machine. The computer readable medium includes instructions to intercept, by an agent executing on a local computing machine, a first call to a drawing library, the first call generated by an application requesting information from the drawing library, and instructions to transmit, by the agent, a first frame, generated by the application, to a remote computing machine. Also included are instructions to prevent, upon failing to receive a notification indicating the first frame was rendered, a return of the first call to the requesting application; instructions to receive, by the agent, a notification, generated by the remote computing machine, indicating the first frame was rendered; and instructions to permit, by the agent, the return of the first call to the requesting application.

DETAILED DESCRIPTION OF THE DRAWINGS

The following figures depict certain illustrative embodiments of methods and systems for either remotely providing three-dimensional graphics, methods and systems for the hybrid rendering of such graphics, the use of hash based caching to compress three-dimensional graphics, the detection of dirty regions within a three-dimensional drawing region, and improving resource utilization by delaying the rendering of three-dimensional data during remote presentation of three-dimensional graphics, where like reference numerals refer to like elements. Each depicted embodiment is illustrative of the methods and systems and not limiting.

DETAILED DESCRIPTION

Figure 1A:
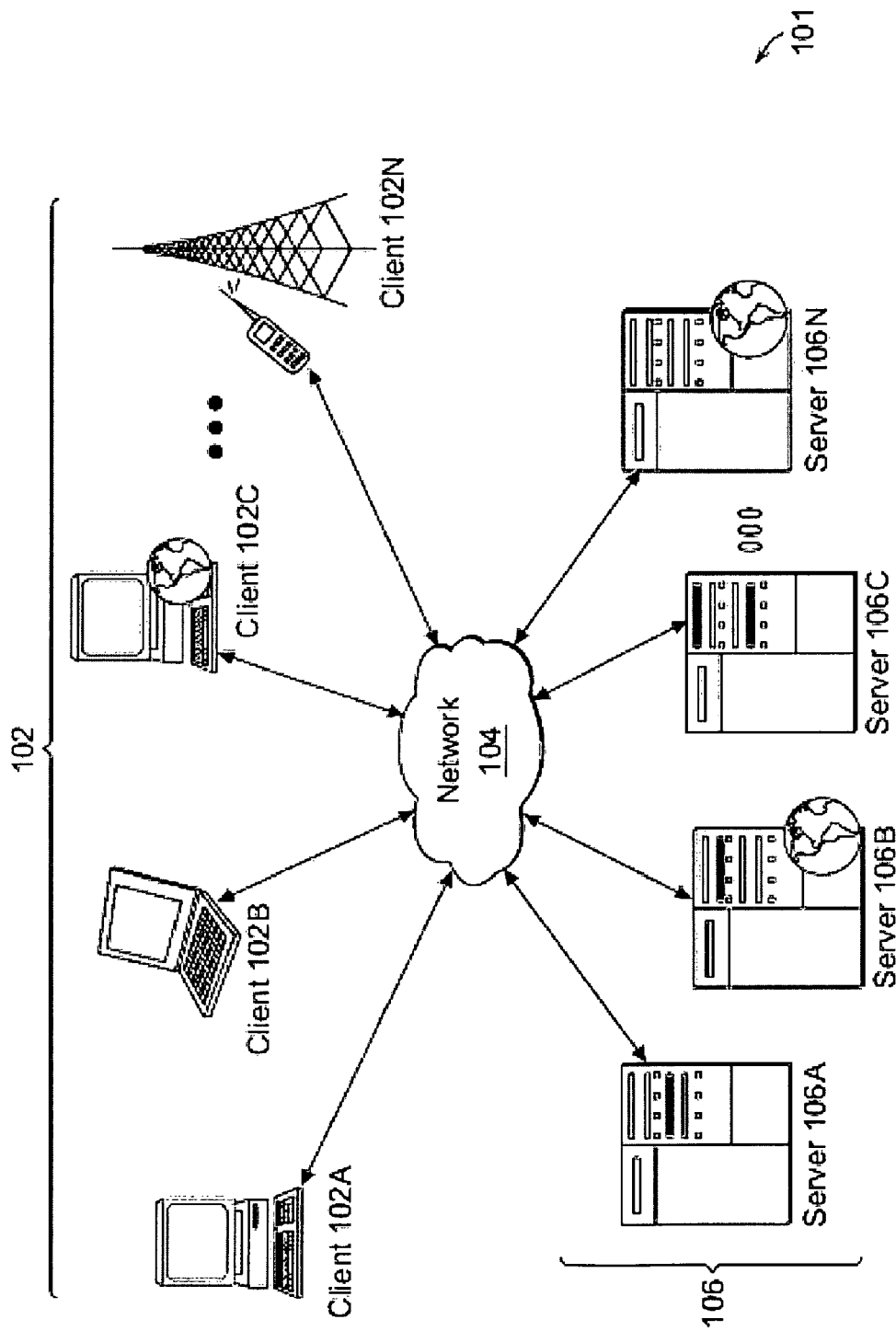
FIG. 1A is a block diagram illustrative of an embodiment of a remote-access, networked environment with a client machine that communicates with a server.

FIG. 1A illustrates one embodiment of a computing environment 101 that includes one or more client machines 102A-102N in communication with servers 106A-106N, and a network 104 installed in between the client machines 102A-102N and the servers 106A-106N. In some embodiments, client machines 102A-10N may be referred to as a single client machine 102 or a single group of client machines 102, while servers may be referred to as a single server 106 or a single group of servers 106. One embodiment includes a single client machine 102 communicating with more than one server 106, another embodiment includes a single server 106 communicating with more than one client machine 102, while another embodiment includes a single client machine 102 communicating with a single server 106.

A client machine 102 within the computing environment may in some embodiments, be referenced by any one of the following terms: client machine(s) 102; client(s); client computer(s); client device(s); client computing device(s); client node(s); endpoint(s); endpoint node(s); or a second machine. The server 106 in some embodiments may be referenced by any one of the following terms: server(s), server farm(s), host computing device(s), or a first machine(s).

The client machine 102 can in some embodiments execute, operate or otherwise provide an application that can be any one of the following: software; a program; executable instructions; a web browser; a web-based client; a client-server application; a thin-client computing client; an ActiveX control; a Java applet; software related to voice over internet protocol (VoIP) communications like a soft IP telephone; an application for streaming video and/or audio; an application for facilitating real-time-data communications; a HTTP client; a FTP client; an Oscar client; a Telnet client; or any other type and/or form of executable instructions capable of executing on client machine 102. Still other embodiments may include a computing environment 101 with an application that is any of either server-based or remote-based, and an application that is executed on the server 106 on behalf of the client machine 102. Further embodiments of the computing environment 101 include a server 106 configured to display output graphical data to a client machine 102 using a thin-client or remote-display protocol, where the protocol used can be any one of the following protocols: the Independent Computing Architecture (ICA) protocol manufactured by Citrix Systems, Inc. of Ft. Lauderdale, Fla.; or the Remote Desktop Protocol (RDP) manufactured by the Microsoft Corporation of Redmond, Wash.

In one embodiment, the client machine 102 can be a virtual machine 102C such as those manufactured by XenSolutions, Citrix Systems, IBM, VMware, or any other virtual machine able to implement the methods and systems described herein.

The computing environment 101 can, in some embodiments, include more than one server 106A-106N where the servers 106A-106N are: grouped together as a single server 106 entity, logically-grouped together in a server farm 106; geographically dispersed and logically grouped together in a server farm 106, located proximate to each other and logically grouped together in a server farm 106. Geographically dispersed servers 106A-106N within a server farm 106 can, in some embodiments, communicate using a WAN, MAN, or LAN, where different geographic regions can be characterized as: different continents; different regions of a continent; different countries; different states; different cities; different campuses; different rooms; or any combination of the preceding geographical locations. In some embodiments the server farm 106 may be administered as a single entity or in other embodiments may include multiple server farms 106. The computing environment 101 can include more than one server 106A-106N grouped together in a single server farm 106 where the server farm 106 is heterogeneous such that one server 106A-106N is configured to operate according to a first type of operating system platform (e.g., WINDOWS NT, manufactured by Microsoft Corp. of Redmond, Wash.), while one or more other servers 106A-106N are configured to operate according to a second type of operating system platform (e.g., Unix or Linux); more than one server 106A-106N is configured to operate according to a first type of operating system platform (e.g., WINDOWS NT), while another server 106A-106N is configured to operate according to a second type of operating system platform (e.g., Unix or Linux); or more than one server 106A-106N is configured to operate according to a first type of operating system platform (e.g., WINDOWS NT) while more than one of the other servers 106A-106N are configured to operate according to a second type of operating system platform (e.g., Unix or Linux).

The computing environment 101 can in some embodiments include a server 106 or more than one server 106 configured to provide the functionality of any one of the following server types: a file server; an application server; a web server; a proxy server; an appliance; a network appliance; a gateway; an application gateway; a gateway server; a virtualization server; a deployment server; a SSL VPN server; a firewall; a web server; an application server or as a master application server; a server 106 configured to operate as an active direction; a server 106 configured to operate as application acceleration application that provides firewall functionality, application functionality, or load balancing functionality, or other type of computing machine configured to operate as a server 106. In some embodiments, a server 106 may include a remote authentication dial-in user service such that the server 106 is a RADIUS server. Embodiments of the computing environment 101 where the server 106 comprises an appliance, the server 106 can be an appliance manufactured by any one of the following manufacturers: the Citrix Application Networking Group; Silver Peak Systems, Inc; Riverbed Technology, Inc.; F5 Networks, Inc.; or Juniper Networks, Inc. Some embodiments include a server 106 with the following functionality: a first server 106A that receives requests from a client machine 102, forwards the request to a second server 106B, and responds to the request generated by the client machine with a response from the second server 106B; acquires an enumeration of applications available to the client machines 102 and address information associated with a server 106 hosting an application identified by the enumeration of applications; presents responses to client requests using a web interface; communicates directly with the client 102 to provide the client 102 with access to an identified application; receives output data, such as display data, generated by an execution of an identified application on the server 106.

The server 106 can be configured to execute any one of the following applications: an application providing a thin-client computing or a remote display presentation application; any portion of the CITRIX ACCESS SUITE by Citrix Systems, Inc. like the METAFRAME or CITRIX PRESENTATION SERVER; MICROSOFT WINDOWS Terminal Services manufactured by the Microsoft Corporation; or an ICA client, developed by Citrix Systems, Inc. Another embodiment includes a server 106 configured to execute an application so that the server may function as an application server such as any one of the following application server types: an email server that provides email services such as MICROSOFT EXCHANGE manufactured by the Microsoft Corporation; a web or Internet server; a desktop sharing server; or a collaboration server. Still other embodiments include a server 106 that executes an application that is any one of the following types of hosted servers applications: GOTOMEETING provided by Citrix Online Division, Inc.; WEBEX provided by WebEx, Inc. of Santa Clara, Calif.; or Microsoft Office LIVE MEETING provided by Microsoft Corporation.

In one embodiment, the server 106 may be a virtual machine 106B such as those manufactured by Citrix Systems, IBM, VMware, or any other virtual machine able to implement the methods and systems described herein.

Client machines 102 may function, in some embodiments, as a client node seeking access to resources provided by a server 106, or as a server 106 providing other clients 102A-102N with access to hosted resources. One embodiment of the computing environment 101 includes a server 106 that provides the functionality of a master node. Communication between the client machine 102 and either a server 106 or servers 106A-106N can be established via any of the following methods: direct communication between a client machine 102 and a server 106A-106N in a server farm 106; a client machine 102 that uses a program neighborhood application to communicate with a server 106a-106n in a server farm 106; or a client machine 102 that uses a network 104 to communicate with a server 106A-106N in a server farm 106. One embodiment of the computing environment 101 includes a client machine 102 that uses a network 104 to request that applications hosted by a server 106A-106N in a server farm 106 execute, and uses the network 104 to receive from the server 106A-106N graphical display output representative of the application execution. In other embodiments, a master node provides the functionality required to identify and provide address information associated with a server 106 hosting a requested application. Still other embodiments include a master node that can be any one of the following: a server 106A-106N within the server farm 106; a remote computing machine connected to the server farm 106 but not included within the server farm 106; a remote computing machine connected to a client 102 but not included within a group of client machines 102; or a client machine 102.

The network 104 between the client machine 102 and the server 106 is a connection over which data is transferred between the client machine 102 and the server 106. Although the illustration in FIG. 1A depicts a network 104 connecting the client machines 102 to the servers 106, other embodiments include a computing environment 101 with client machines 102 installed on the same network as the servers 106. Other embodiments can include a computing environment 101 with a network 104 that can be any of the following: a local-area network (LAN); a metropolitan area network (MAN); a wide area network (WAN); a primary network 104 comprised of multiple sub-networks 104' located between the client machines 102 and the servers 106; a primary public network 104 with a private sub-network 104'; a primary private network 104 with a public sub-network 104'; or a primary private network 104 with a private sub-network 104'. Still further embodiments include a network 104 that can be any of the following network types: a point to point network; a broadcast network; a telecommunications network; a data communication network; a computer network; an ATM (Asynchronous Transfer Mode) network; a SONET (Synchronous Optical Network) network; a SDH (Synchronous Digital Hierarchy) network; a wireless network; a wireline network; a network 104 that includes a wireless link where the wireless link can be an infrared channel or satellite band; or any other network type able to transfer data from client machines 102 to servers 106 and vice versa to accomplish the methods and systems described herein. Network topology may differ within different embodiments, possible network topologies include: a bus network topology; a star network topology; a ring network topology; a repeater-based network topology; a tiered-star network topology; or any other network topology able transfer data from client machines 102 to servers 106, and vice versa, to accomplish the methods and systems described herein. Additional embodiments may include a network 104 of mobile telephone networks that use a protocol to communicate among mobile devices, where the protocol can be any one of the following: AMPS; TDMA; CDMA; GSM; GPRS UMTS; or any other protocol able to transmit data among mobile devices to accomplish the systems and methods described herein.

Figure 1B:
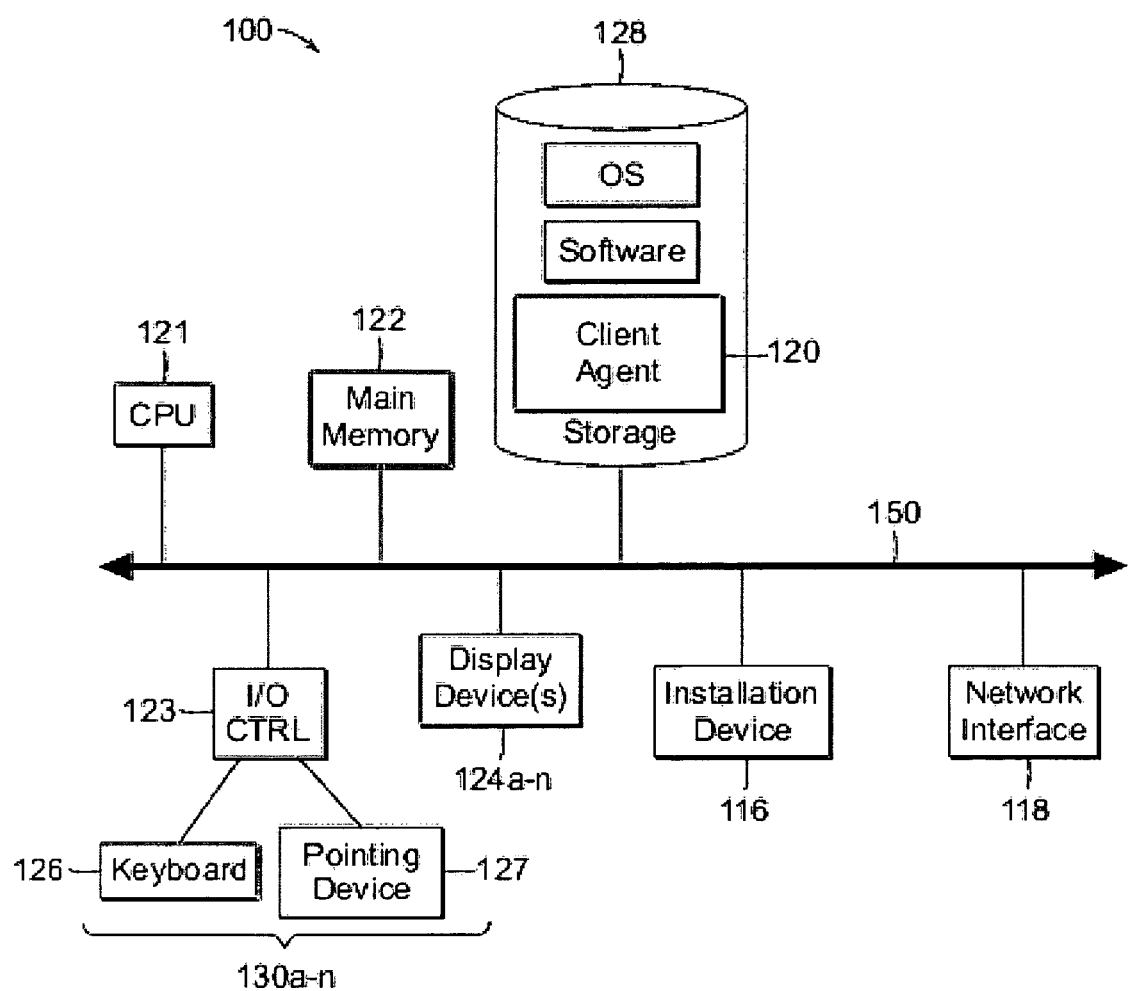
FIGS. 1B and 1C are block diagrams illustrative of an embodiment of computing machines for practicing the methods and systems described herein.

Illustrated in FIG. 1B is an embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a central processing unit 121; a main memory 122; storage memory 128; an input/output (I/O) controller 123; display devices 124A-124N; an installation device 116; and a network interface 118. In one embodiment, the storage memory 128 includes: an operating system, software routines, and a client agent 120. The I/O controller 123, in some embodiments, is further connected to a key board 126, and a pointing device 127. Other embodiments may include an I/O controller 123 connected to more than one input/output device 130A-130N.

Figure 1C:
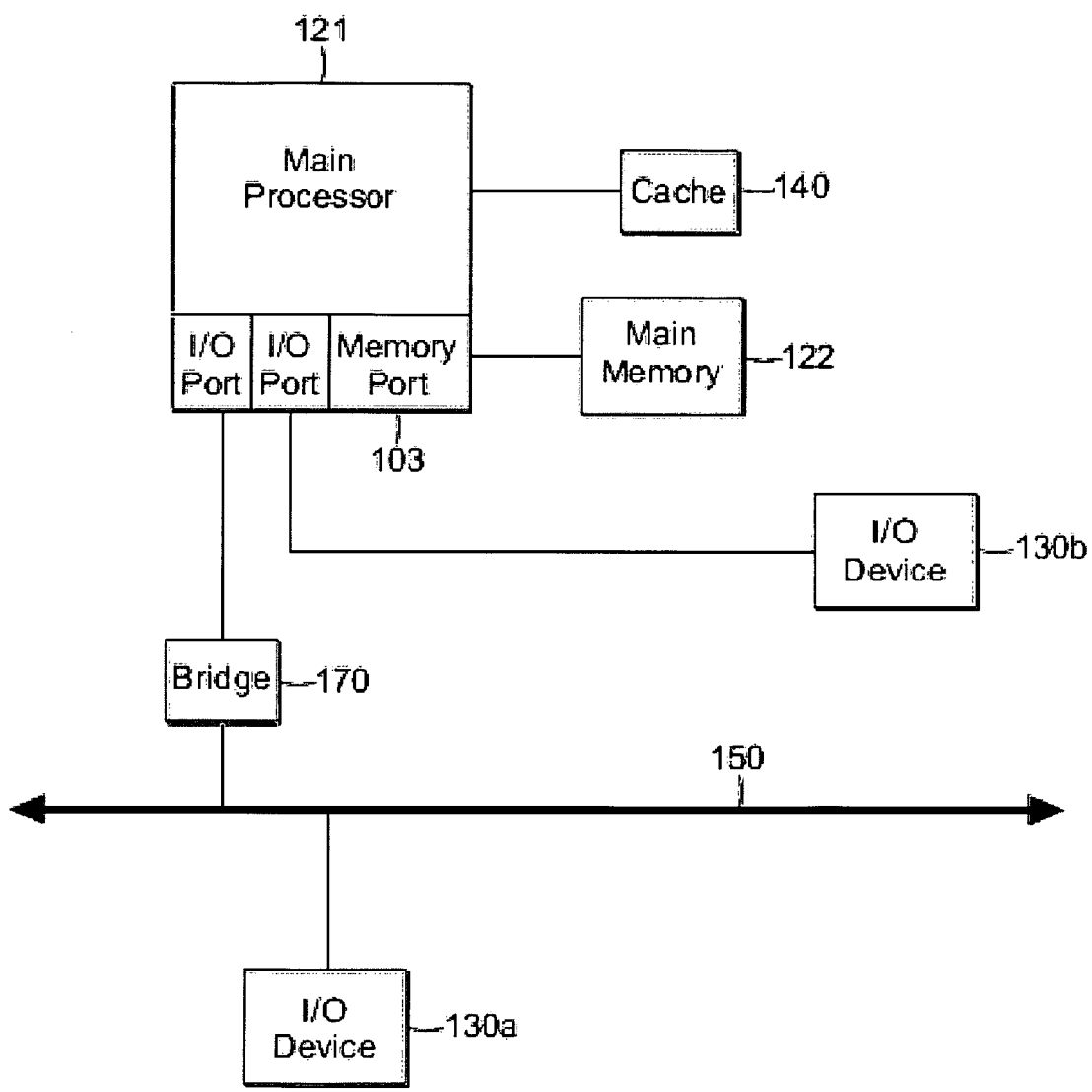

FIG. 1C illustrates one embodiment of a computing device 100, where the client machine 102 and server 106 illustrated in FIG. 1A can be deployed as and/or executed on any embodiment of the computing device 100 illustrated and described herein. Included within the computing device 100 is a system bus 150 that communicates with the following components: a bridge 170, and a first I/O device 130A. In another embodiment, the bridge 170 is in further communication with the central processing unit 121, where the central processing unit 121 can further communicate with a second I/O device 130B, a main memory 122, and a cache memory 140. Included within the central processing unit 121, are I/O ports, a memory port 103, and a main processor.

Embodiments of the computing machine 100 can include a central processing unit 121 characterized by any one of the following component configurations: logic circuits that respond to and process instructions fetched from the main memory unit 122; a microprocessor unit, such as: those manufactured by Intel Corporation; those manufactured by Motorola Corporation; those manufactured by Transmeta Corporation of Santa Clara, Calif.; the RS/6000 processor such as those manufactured by International Business Machines; a processor such as those manufactured by Advanced Micro Devices; or any other combination of logic circuits capable of executing the systems and methods described herein. Still other embodiments of the central processing unit 122 may include any combination of the following: a microprocessor, a microcontroller, a central processing unit with a single processing core, a central processing unit with two processing cores, or a central processing unit with more than one processing cores.

One embodiment of the computing machine 100 includes a central processing unit 121 that communicates with cache memory 140 via a secondary bus also known as a backside bus, while another embodiment of the computing machine 100 includes a central processing unit 121 that communicates with cache memory via the system bus 150. The local system bus 150 can, in some embodiments, also be used by the central processing unit to communicate with more than one type of I/O devices 130A-130N. In some embodiments, the local system bus 150 can be any one of the following types of buses: a VESA VL bus; an ISA bus; an EISA bus; a MicroChannel Architecture (MCA) bus; a PCI bus; a PCI-X bus; a PCI-Express bus; or a NuBus. Other embodiments of the computing machine 100 include an I/O device 130A-130N that is a video display 124 that communicates with the central processing unit 121 via an Advanced Graphics Port (AGP). Still other versions of the computing machine 100 include a processor 121 connected to an I/O device 130A-130N via any one of the following connections: HyperTransport, Rapid I/O, or InfiniBand. Further embodiments of the computing machine 100 include a communication connection where the processor 121 communicates with one I/O device 130A using a local interconnect bus and with a second I/O device 130B using a direct connection.

Included within some embodiments of the computing device 100 is each of a main memory unit 122 and cache memory 140. The cache memory 140 will in some embodiments be any one of the following types of memory: SRAM; BSRAM; or EDRAM. Other embodiments include cache memory 140 and a main memory unit 122 that can be any one of the following types of memory: Static random access memory (SRAM), Burst SRAM or SynchBurst SRAM (BSRAM), Dynamic random access memory (DRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Enhanced DRAM (EDRAM), synchronous DRAM (SDRAM), JEDEC SRAM, PC100 SDRAM, Double Data Rate SDRAM (DDR SDRAM), Enhanced SDRAM (ESDRAM), SyncLink DRAM (SLDRAM), Direct Rambus DRAM (DRDRAM), Ferroelectric RAM (FRAM), or any other type of memory device capable of executing the systems and methods described herein. The main memory unit 122 and/or the cache memory 140 can in some embodiments include one or more memory devices capable of storing data and allowing any storage location to be directly accessed by the central processing unit 121. Further embodiments include a central processing unit 121 that can access the main memory 122 via one of either: a system bus 150; a memory port 103; or any other connection, bus or port that allows the processor 121 to access memory 122.

One embodiment of the computing device 100 provides support for any one of the following installation devices 116: a floppy disk drive for receiving floppy disks such as 3.5-inch, 5.25-inch disks or ZIP disks, a CD-ROM drive, a CD-R/RW drive, a DVD-ROM drive, tape drives of various formats, USB device, a bootable medium, a bootable CD, a bootable CD for GNU/Linux distribution such as KNOPPIX®, a harddrive or any other device suitable for installing applications or software. Applications can in some embodiments include a client agent 120, or any portion of a client agent 120. The computing device 100 may further include a storage device 128 that can be either one or more hard disk drives, or one or more redundant arrays of independent disks; where the storage device is configured to store an operating system, software, programs applications, or at least a portion of the client agent 120. A further embodiment of the computing device 100 includes an installation device 116 that is used as the storage device 128.

Furthermore, the computing device 100 may include a network interface 118 to interface to a Local Area Network (LAN), Wide Area Network (WAN) or the Internet through a variety of connections including, but not limited to, standard telephone lines, LAN or WAN links (e.g., 802.11, T1, T3, 56 kb, X.25, SNA, DECNET), broadband connections (e.g., ISDN, Frame Relay, ATM, Gigabit Ethernet, Ethernet-over-SONET), wireless connections, or some combination of any or all of the above. Connections can also be established using a variety of communication protocols (e.g., TCP/IP, IPX, SPX, NetBIOS, Ethernet, ARCNET, SONET, SDH, Fiber Distributed Data Interface (FDDI), RS232, RS485, IEEE 802.11, IEEE 802.11a, IEEE 802.11b, IEEE 802.11g, CDMA, GSM, WiMax and direct asynchronous connections). One version of the computing device 100 includes a network interface 118 able to communicate with additional computing devices 100' via any type and/or form of gateway or tunneling protocol such as Secure Socket Layer (SSL) or Transport Layer Security (TLS), or the Citrix Gateway Protocol manufactured by Citrix Systems, Inc. Versions of the network interface 118 can comprise any one of: a built-in network adapter; a network interface card; a PCMCIA network card; a card bus network adapter; a wireless network adapter; a USB network adapter; a modem; or any other device suitable for interfacing the computing device 100 to a network capable of communicating and performing the methods and systems described herein.

Embodiments of the computing device 100 include any one of the following I/O devices 130A-130N: a keyboard 126; a pointing device 127; mice; trackpads; an optical pen; trackballs; microphones; drawing tablets; video displays; speakers; inkjet printers; laser printers; and dye-sublimation printers; or any other input/output device able to perform the methods and systems described herein. An I/O controller 123 may in some embodiments connect to multiple I/O devices 103A-130N to control the one or more I/O devices. Some embodiments of the I/O devices 130A-130N may be configured to provide storage or an installation medium 116, while others may provide a universal serial bus (USB) interface for receiving USB storage devices such as the USB Flash Drive line of devices manufactured by Twintech Industry, Inc. Still other embodiments of an I/O device 130 may be a bridge between the system bus 150 and an external communication bus, such as: a USB bus; an Apple Desktop Bus; an RS-232 serial connection; a SCSI bus; a FireWire bus; a FireWire 800 bus; an Ethernet bus; an AppleTalk bus; a Gigabit Ethernet bus; an Asynchronous Transfer Mode bus; a HIPPI bus; a Super HIPPI bus; a SerialPlus bus; a SCI/LAMP bus; a Fibre-Channel bus; or a Serial Attached small computer system interface bus.

In some embodiments, the computing machine 100 can connect to multiple display devices 124A-124N, in other embodiments the computing device 100 can connect to a single display device 124, while in still other embodiments the computing device 100 connects to display devices 124A-124N that are the same type or form of display, or to display devices that are different types or forms. Embodiments of the display devices 124A-124N can be supported and enabled by the following: one or multiple I/O devices 130A-130N; the I/O controller 123; a combination of I/O device(s) 130A-130N and the I/O controller 123; any combination of hardware and software able to support a display device 124A-124N; any type and/or form of video adapter, video card, driver, and/or library to interface, communicate, connect or otherwise use the display devices 124a-124n. The computing device 100 may in some embodiments be configured to use one or multiple display devices 124A-124N, these configurations include: having multiple connectors to interface to multiple display devices 124a-124n; having multiple video adapters, with each video adapter connected to one or more of the display devices 124A-124N; having an operating system configured to support multiple displays 124A-124N; using circuits and software included within the computing device 100 to connect to and use multiple display devices 124A-124N; and executing software on the main computing device 100 and multiple secondary computing devices to enable the main computing device 100 to use a secondary computing device's display as a display device 124A-124N for the main computing device 100. Still other embodiments of the computing device 100 may include multiple display devices 124A-124N provided by multiple secondary computing devices and connected to the main computing device 100 via a network.

In some embodiments of the computing machine 100, an operating system may be included to control task scheduling and access to system resources. Embodiments of the computing device 100 can run any one of the following operation systems: versions of the MICROSOFT WINDOWS operating systems such as WINDOWS 3.x; WINDOWS 95; WINDOWS 98; WINDOWS 2000; WINDOWS NT 3.51; WINDOWS NT 4.0; WINDOWS CE; WINDOWS XP; and WINDOWS VISTA; the different releases of the Unix and Linux operating systems; any version of the MAC OS manufactured by Apple Computer; OS/2, manufactured by International Business Machines; any embedded operating system; any real-time operating system; any open source operating system; any proprietary operating system; any operating systems for mobile computing devices; or any other operating system capable of running on the computing device and performing the operations described herein. One embodiment of the computing machine 100 has multiple operating systems installed thereon.

The computing machine 100 can be embodied in any one of the following computing devices: a computing workstation; a desktop computer; a laptop or notebook computer; a server; a handheld computer; a mobile telephone; a portable telecommunication device; a media playing device; a gaming system; a mobile computing device; a device of the IPOD family of devices manufactured by Apple Computer; any one of the PLAYSTATION family of devices manufactured by the Sony Corporation; any one of the Nintendo family of devices manufactured by Nintendo Co; any one of the XBOX family of devices manufactured by the Microsoft Corporation; or any other type and/or form of computing, telecommunications or media device that is capable of communication and that has sufficient processor power and memory capacity to perform the methods and systems described herein. In other embodiments the computing machine 100 can be a mobile device such as any one of the following mobile devices: a JAVA-enabled cellular telephone or personal digital assistant (PDA), such as the i55sr, i58sr, i85s, i88s, i90c, i95cl, or the im1100, all of which are manufactured by Motorola Corp; the 6035 or the 7135, manufactured by Kyocera; the i300 or i330, manufactured by Samsung Electronics Co., Ltd; the TREO 180, 270, 600, 650, 680, 700p, 700w, or 750 smart phone manufactured by Palm, Inc; any computing device that has different processors, operating systems, and input devices consistent with the device; or any other mobile computing device capable of performing the methods and systems described herein. Still other embodiments of the computing environment 101 include a mobile computing device 100 that can be any one of the following: any one series of Blackberry, or other handheld device manufactured by Research In Motion Limited; the iPhone manufactured by Apple Computer; any handheld or smart phone; a Pocket PC; a Pocket PC Phone; or any other handheld mobile device supporting Microsoft Windows Mobile Software.

Figure 2:
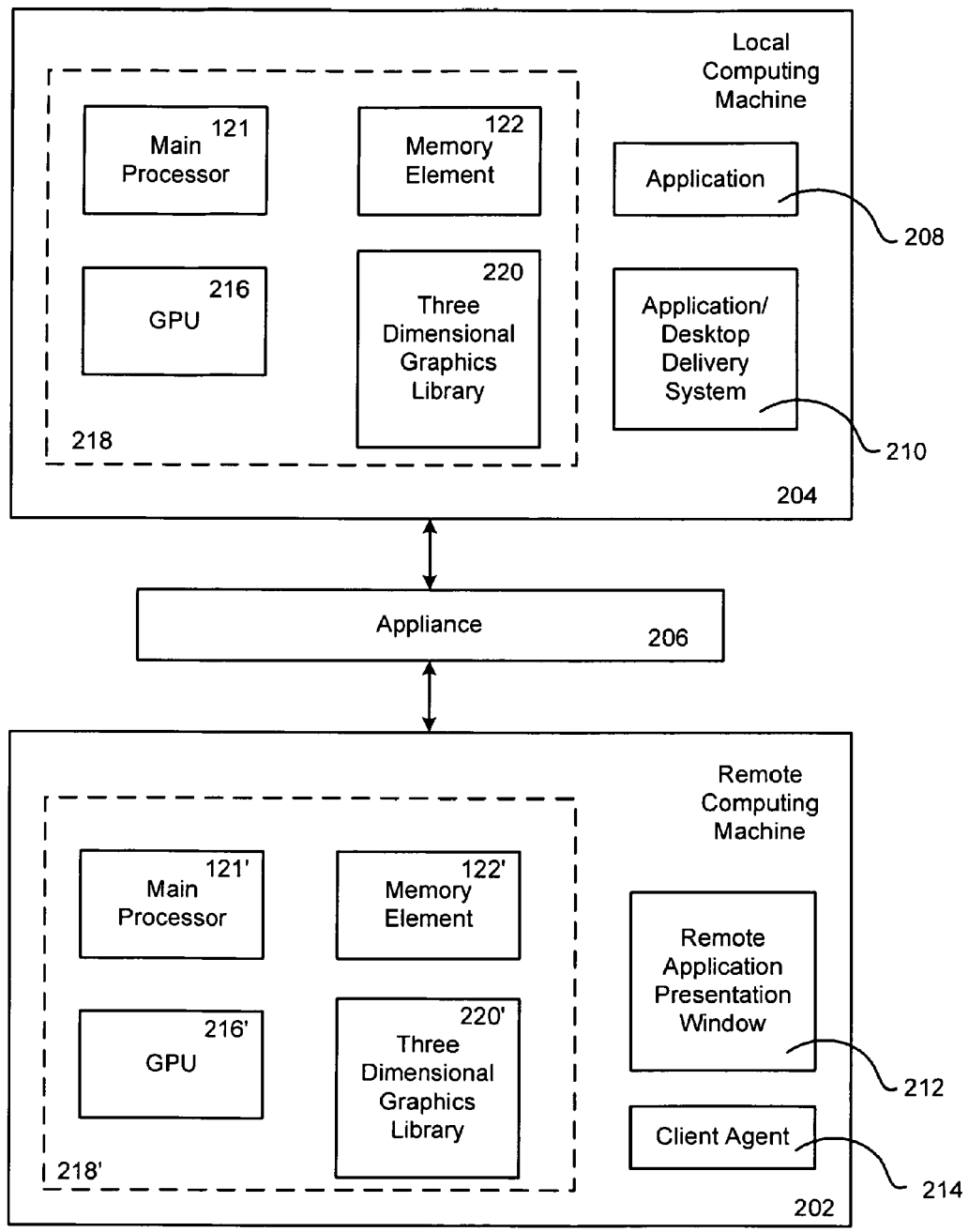
FIG. 2 is a block diagram illustrative of an embodiment of a system for remoting three-dimensional graphics.

With reference to FIG. 2, one embodiment of a system for displaying graphics and other application output at a remote computing machine 202 is shown and described. As shown, the system includes a remote computing machine 202 communicating with one or more local computing machines 204. The remote computing machine 202 and the local computing machines 204 may be embodiments of the computing device 102. In some embodiments, we may refer to the remote computing machine 202 as a client device and the local computing machines 204 as servers. The system also includes one or more GPUs 216, 216' or GPU appliances, in connection with one or more of the computing devices. The local computing device 204 communicates to the remote computing machine 202 via an appliance 206. The appliance 206 may be a proxy, gateway, intermediary, or any network node. In some embodiments, the appliance 206 may be a GPU appliance or can include a GPU appliance.

The local computing machine 204 provides application output to the remote computing machine 202 in response to the executing of one or more applications 208 at the local computing machine 204. The local computing machine 204 can also provide desktop data for rendering at the remote computing machine 202. The application/desktop data can include image data and/or windowing data for processing and/or rendering at the remote computing machine 202. In such embodiments, an Application/Desktop Delivery System 210 communicates the application/desktop data to the remote computing machine 202. The application/desktop data, responsive to the rendering process at the remote computing machine 202, is displayed via a Remote Application Presentation Window 212 at the remote computing machine 202. In some embodiments, the local computing machine 204 is not executing the applications 208 and instead an application 208 is streamed to the remote computing machine 202 for local execution.

Each of the remote computing machine 202 and local computing device 204 may include a main processor 121, 121', a Graphical Processing Unit (GPU) 216, 216', memory element 122, 122', and a three-dimensional Graphics Library 220, 220'. The main processor 121, 121' may be any embodiment of the CPU or Main Processor 101 described above in connection with FIGS. 1B and 1C. The GPU can in some embodiments be a hardware component dedicated to processing graphics commands, while in other embodiments, the GPU can be a set of executable commands, or executable program able to process graphics commands. The memory element 122 may be any embodiment of the main memory 122 described above in connection with FIGS. 1B and 1C. The three-dimensional Graphics Library 220, 220' may be a library associated with Direct3D, OPEN GL or other three-dimensional graphics Application Program Interface (API). Although each of these elements may provide the same or substantially the same functionality between the remote computing machine 202 and local computing device 204, this can provide redundancy as well as the flexibility to allow the rendering location to be located between the remote computing machine 202 and local computing device 204.

The remote computing machine 202 includes a client agent 214 that provides certain functionality for use in determining where to render graphics data. The local computing machine 204 can also include a server agent (not shown) for providing substantially similar functionality for the local computing machines 204, appliance 206, and network. In other embodiments, a single "graphics determination agent" resident somewhere within the system provides the below-described functionality. Factors considered in making a determination as to where to render graphics information, include, but are not limited to: the type of graphics primitives being used (e.g., OPEN GL, DirectX, Direct3D, 3DNOW, GDI, MILCORE, and so on); the GPU capabilities of the remote computing machine 202, the local computing machines 204, the appliance 206, and the GPU appliance; the type, status and delivery speed of the network; the type of application being executed (e.g., CATIA, AUTOCAD, WINDOWS MEDIA PLAYER); and the type of remote access session being used (e.g., Terminal Services, Citrix Presentation Server, Citrix Desktop Server, application streaming and so on).

In various embodiments, the selection of the rendering location can change from time-to-time, that is, the selection of the rendering location is dynamic in nature. This selection, and the determination of the selection, can be made on a real-time basis, a per-session basis, a per-user basis, or according to any other mechanism. For example, an initial scan of the system configuration may determine to use the remote computing machine's 202 GPU 216' to render the graphics. At a later time, conditions may change and thus it may provide a better end-user experience to render the graphics at the local computing machines 204 and/or the GPU appliance 250. However, portions of the session can be rendered using different methods. For example, portions of a desktop or application image data can be rendered using a rendering process at the local computing machine 204 while other portions can be rendered using "client-side" rendering. Further, the selection of the rendering location can occur according to particular graphics operations (e.g., vector drawing, texture mapping, and the like). The rendering location can differ based on the type of graphics operation. Different rendering options can be used at the same time for different operations. For example, a spinning globe may be rendered on the remote computing machine 202, but the background static graphics may be rendered on the local computing machine 204. Also, selection can occur based on a pattern of graphics operations (e.g., if many small shaded objects are drawn sequentially).

In some embodiments, the selection of which local computing machine to run the desktop or application, can be based on what types of graphics rendering are most efficient. The "load balancing" selection can be based on the graphics rendering policy evaluation. For example, if a remote computing machine 202 does not have a GPU 216' with the capability or capacity to handle the image data, but the application needs it, then a local computing machine 204 is selected that has an available and suitable GPU 216.

In one embodiment, network bandwidth latency, remote computing machine capabilities, the application type of the application 208, past history, and any other graphics performance policy rules may be evaluated. If performing rendering at the local computing machine 204 is determined to be the most efficient or suitable, a local computing machine 204 that is capable of performing such rendering would be selected. Other load balancing policies can affect local computing machine selection as well (e.g., user, location, date, time, application licensing, CPU, disk usage, memory, etc). More intense graphical usage may be routed to computing machines that have a better performing GPU or have more GPUs in comparison with other local computing machines. In the case of sharing the server and GPUs, the load on the available GPUs can be taken into account.

In Windows Vista, a DirectX application sends graphics to a Direct3D graphics runtime module which cooperates with a user mode driver and a graphics kernel to render the DirectX graphics commands on available hardware. When a DirectX application executes in Terminal Services, there may be a degradation in the execution of the DirectX application and the generation of enhanced graphics. One cause of the possible degradation in performance is that the application, when executing in Terminal Services, no longer has access to graphics rendering hardware such as a graphics processing unit (GPU). Thus, the DirectX application relies on software, executing in the Direct3D runtime and kernel, to render the DirectX graphics commands into graphical data. Loss of access to graphics rendering hardware may therefore degrade the performance of the DirectX application. A similar situation may also occur in the same or another operating system using OPEN GL or other three-dimensional API in place of Direct3D.

Figure 3:
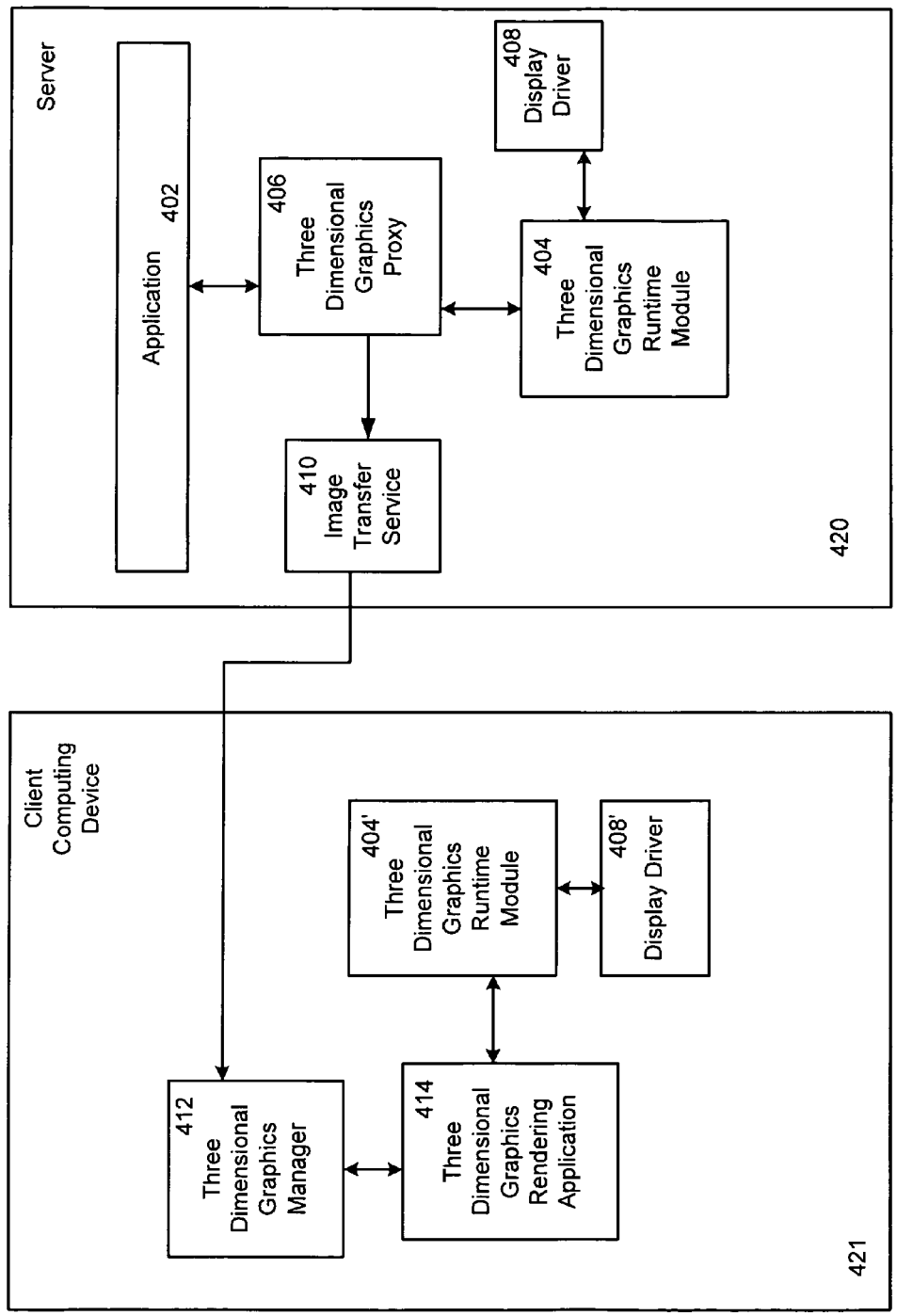
FIG. 3 is a block diagram illustrative of an embodiment of a system for remoting three-dimensional graphics.

Illustrated in FIG. 3 is an embodiment of a system that can alleviate the potential issues associated with executing a DirectX application in terminal services, as described above. The system comprises client-side or terminal-side 421 components and server-side 420 components. Included in this system is a three-dimensional Rendering Application 414 in communication with a three-dimensional runtime module 404'. A three-dimensional proxy 406 is included and is in communication with a three-dimensional Graphics Runtime module 404.

Further referring to FIG. 3 and in more detail, described is a system that, in some embodiments, permits graphics applications, such as DirectX applications, executing in terminal services to use the graphics hardware on the server as opposed to software executing in the three-dimensional graphics runtime module 404. Such a system can focus on the use of DirectX and Windows Presentation Foundation applications. In some of these embodiments, the three-dimensional rendering application 414 may be a Direct3D rendering application, the three-dimensional runtime modules 404, 404' may be Direct3D runtime modules, and the three-dimensional proxy 406 may be a Direct3D proxy, for example. Any of the components of the system may be components associated with Direct3D, OPEN GL or other three-dimensional graphics API.

The three-dimensional Rendering Application 414 transmits commands to the Three-dimensional Runtime Module 404'. The three-dimensional Rendering Application 414 acts as a proxy for the application in the session by receiving commands forwarded from the three-dimensional proxy 406. In operation, as an application attempts to drive the three-dimensional system to render a scene, the three-dimensional proxy 406 reroutes its graphics commands to the three-dimensional Graphics Rendering Application 414, which, in turn, sends these commands to its three-dimensional Graphics Runtime module 404' as if it were the requesting application. Further, the three-dimensional proxy 406 allows the application to operate just like it normally would when communicating with the three-dimensional Graphics Runtime module 404 in the session or server space.

In one embodiment, the three-dimensional proxy 406 intercepts three-dimensional graphics calls (e.g., Direct3D calls) and routes them to the three-dimensional Rendering Application 414 running in the console or client session. Also, the three-dimensional proxy 406 initiates communication between itself and the three-dimensional Graphics Manager 412. In some embodiments, the three-dimensional Graphical proxy 406 initiates communication between itself and the three-dimensional Graphics Manager 412 via an Image Transfer Service 410. The three-dimensional Graphics Manager 412, in response to the initiation, creates the three-dimensional graphics rendering application service. In some embodiments, the three-dimensional Graphical proxy 406 hooks or intercepts the real runtime calls but may only target graphics calls that would have been handled by the display driver 408.

In one embodiment, a three-dimensional Graphics Manager 412 creates the three-dimensional Rendering Application 414 service and establishes a communication path between the three-dimensional Rendering Application 414 and the three-dimensional Graphics proxy 406 which requested server hardware support.

In summary, the embodiment of the architecture described above with reference to FIG. 3 provides access to the graphics hardware of the server 420 (e.g., a GPU or GPU appliance) in a terminal service session. As a result, the process of remote-transporting bitmapped graphics to the remote computing machine or client 421 may be an improvement over rendering the bitmaps in software.

In another embodiment, the Application 502 may provide a "desktop" such as the AERO desktop provided by WINDOWS Vista and the remote computing machine 421 is accessing a remote desktop on the local computing machine or server 420. In some embodiments, the client's 421 GPU is used to render either the OPEN GL or Direct3D scenes associated with the desktop. In one aspect, the transmission of the graphics information from the local computing machine 420 to the remote computing machine 421 can be improved relative to other scenarios.

Figure 4:
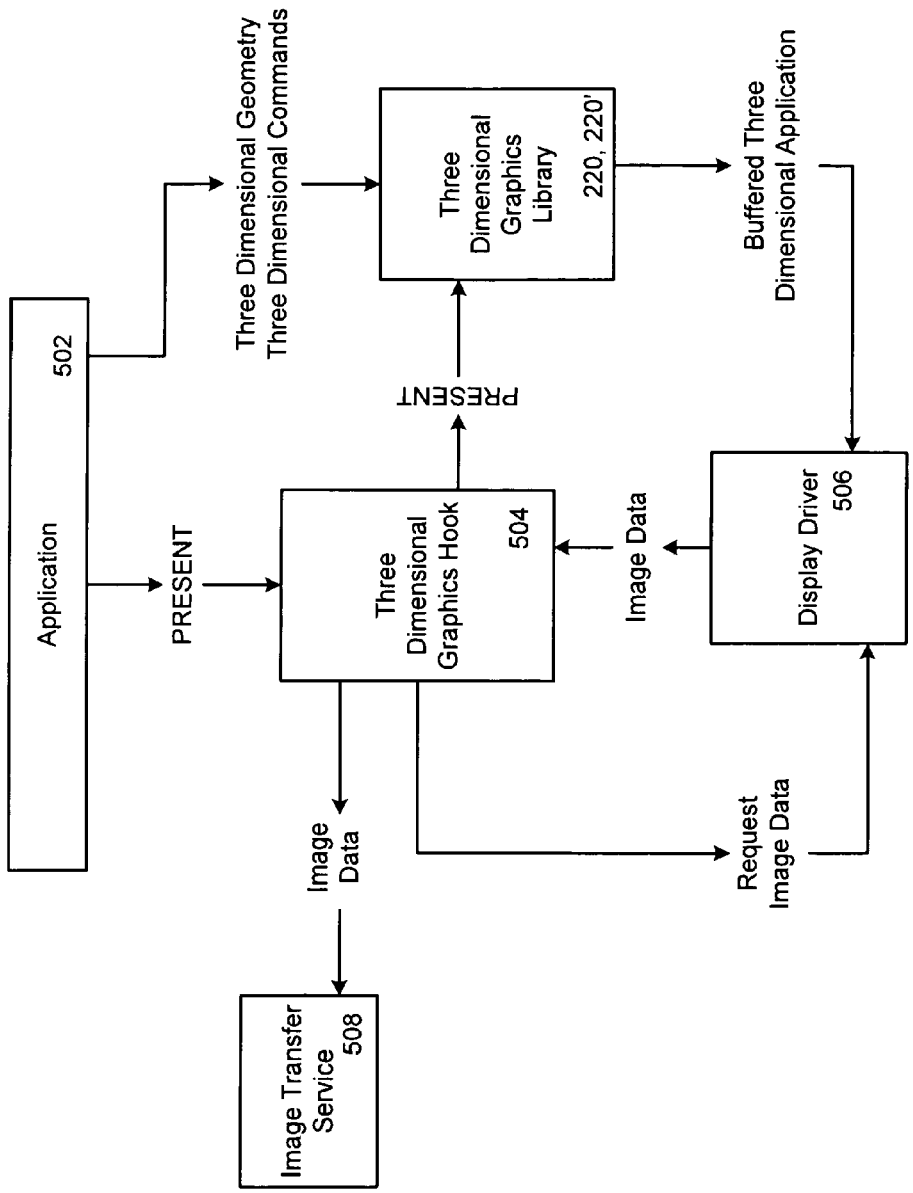
FIG. 4 is a flow diagram illustrative of an embodiment of a method for remotely providing three-dimensional graphics.

With reference to FIG. 4, a diagram shows one embodiment of an architecture that outlines the components and data flow between the components. In this architecture, the layering between the display driver and application is thin so as to limit the overhead and development effort.

In one embodiment, the architecture includes an Application 402. The Application 402 may be a Desktop Windows Manager (DWM) module. In one embodiment, the Application 402 is a Windows Presentation Foundation (WPF) application that acts as a window manager. The Application 402 can interact with a D3D9Ex interface. The Application 402 is responsible for rendering the non-client portion of the windows and the transition effects that affect the windows. In one embodiment, the Application 402 is provided by the system or application that uses Direct3D, OPEN GL or other three-dimensional graphics API. In some embodiments, the Application 402 uses Direct3D to create a desktop. The Application 402 provides the 3D geometry to render the desktop scene on a display. In some aspects, the Application 402 drives the three-dimensional system (e.g., Direct3D system) to render the scene associated with the desktop. In such embodiments, the Application 402 may have no specific function, but rather is the source of the three-dimensional geometry.

The architecture also includes a three-dimensional Graphics Hook module 504. In one embodiment, the three-dimensional Graphics Hook module 504 provides functionality to detect screen updates by intercepting a Present call that causes the back buffer to be switched with the front buffer. Once the hook detects the Present call, the hook passes that call through to one or more three-dimensional Graphics Libraries 220, 220'. The hook collects the window information for the application and the image data from the graphics card via the Display Driver 506. The hook then presents both the image data and window information to the Image Transfer Service 508.

In some embodiments, the three-dimensional Graphics Hook module 504 provides functionality related to: detecting screen updates; hooking the three-dimensional data to detect screen updates; presenting the Image Transfer Service 508 with data such as image data from the graphics card and information for the context. Also, the three-dimensional Graphics Hook module 504 provides a reliable hooking environment with limited overhead. The image collection process, via the three-dimensional Graphics Hook module 504, collects portions of the screen that are being updated through the Present call.

As discussed above, the architecture includes three-dimensional Graphics Libraries 220, 220'. In one embodiment, a three-dimensional Graphics Library 220 is a dynamic link library (dll). The three-dimensional Graphics Libraries 220, 220' provides functionality related to buffering of commands and geometry data from the Application 502, to be sent to a hardware display driver, such as Display Driver 506. In some embodiments, the three-dimensional Graphics Libraries 220, 220' packages the three-dimensional graphics calls into buffers for bulk transfer. The Display Driver 506 can be an existing hardware driver on the server 420. The Display Driver 506 operates as a conventional hardware display driver, and also allows the three-dimensional Graphics Hook module 504 to collect image data off the graphics card. The Display Driver 506 also renders the associated scene into a bitmap and delivers the image to the three-dimensional Graphics Hook module 504. In one embodiment, the three-dimensional Graphics Hook module 504 sends a request to the Display Driver 506. Responsive to the request, the Display Driver 506 transmits image data to the three-dimensional Graphics Hook module 504.

The architecture also includes an Image Transfer Service module 508, as mentioned above. This module communicates with the three-dimensional Graphics Hook module 504. The Image Transfer Service module 508 may also communicate with a Winstation Driver (not shown). The Image Transfer Service module 508 includes functionality for an image transport virtual channel that delivers image data to the client 421. In various embodiments, the Image Transfer Service module 508 implements one or more compression schemes, for example, aggressive compression. As used herein, aggressive compression refers to a compression process that lowers the quality of images during animation routines to allow more throughput at the cost of image quality. This process may improve frame refresh rates by reducing the level of detail in the image during animation. The final frame of the animation, or each animation section, may be determined and sent at a higher quality.

In some embodiments, the Image Transfer Service module 508 requests the image data from the three-dimensional Graphics Hook module 504, and may implement any combination of aggressive compression, caching, and implementing a new image virtual channel. Further, the Image Transfer Service module 508 can receive Window notifications. Additionally, the Image Transport Service module 508 aides in managing the network traffic to achieve maximum frame rates or rates meeting a certain service level.

The architecture may also include a Winstation Driver module (not shown), as mentioned above. In some embodiments, the Winstation Driver module aides in implementing the virtual channel multiplexing to a single connection. This includes the implementation of optimizations for network traffic and virtual channel priorities queues.

Figure 5A:
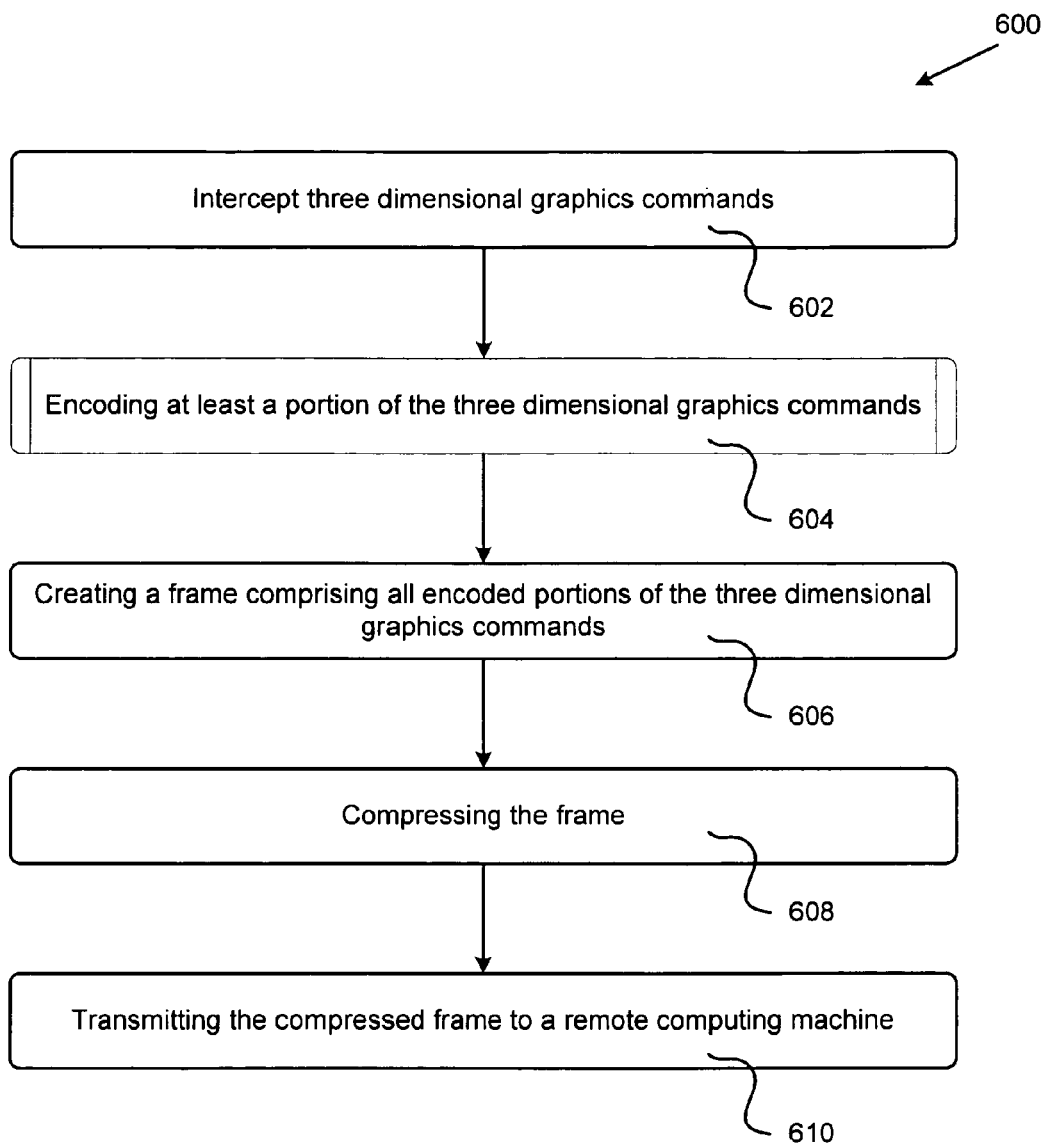
FIGS. 5A-5B are flow diagrams illustrative of embodiments of methods for remotely providing three-dimensional graphics to a client machine.

Illustrated in FIG. 5A is an embodiment of a method 600 for remotely providing three-dimensional graphics commands to a remotely located machine. The three-dimensional graphics are first intercepted (step 602) by an agent, and at least a portion of the three-dimensional graphics commands are encoded by the agent (step 604). A frame is then created that comprises all encoded portions of the three-dimensional graphics commands (step 606). The frame is compressed (step 608) and the compressed frame is transmitted to a remote computing machine (step 610).

Further referring to FIG. 5A and in more detail, the method 600 in some embodiments is carried out by an agent executing on any one of: a first computing machine; a computer; a computing device; a server; a server farm; a distributed computing system; a network; or any other computing device embodiment, or network embodiment described herein. In many of these embodiments, the agent executes on the same computing machine, network or appliance as the one on which the three-dimensional application is executing. While in some embodiments the agent is a virtual object executing on a local machine, the agent may also be a function, set of commands, or other computing object executing on a computing machine in a distributed computing environment.

Three-dimensional graphics commands are generated by an application executing on a computing machine, these three-dimensional graphics commands are in some embodiments intercepted (step 602) by an agent or other computing object executing on the same machine as the machine on which the application executes. In one embodiment, the agent intercepts the three-dimensional graphics by hooking into the present call of the application. By doing this, the agent can determine, via application program interfaces, when the application sends graphics commands to a three-dimensional graphics runtime module. Once the agent knows that the application has made a call to the three-dimensional graphics runtime application program interface, the agent can then intercept the call and redirect it to the client so that the three-dimensional graphics can be replayed on the client. In one embodiment, the agent sends all commands directly to the client, while in other embodiments a portion of the three-dimensional graphics commands are rendered on the server and a portion of the three-dimensional graphics commands are rendered on the client. When commands are sent to the client, in one embodiment they can be any combination of compressed, optimized, batched, encoded and transmitted across a network from a local computing machine or server to a remote computing machine or client computing machine. In such embodiments, what is transmitted to the client computing machine or remote computing machine is a frame containing any combination of: three-dimensional drawing commands; a render state; and resources needed to render or draw a two-dimensional graphical representation or a two-dimensional surface render target that represents the projection of three-dimensional onto a portion of a two-dimensional plane or drawing surface. Thus, in these embodiments, the server or local computing machine transmits frames to the client computing machine or remote computing device, which then maps the commands to a three-dimensional graphics runtime module that accepts the frames and renders three-dimensional data from the accepted frames.

In one embodiment, a portion of the three-dimensional graphics commands are encoded (step 604) by the agent or by another system object, function or agent that is in communication with the agent. In one embodiment, there can be multiple three-dimensional structures represented by the three-dimensional graphics commands. For example, the three-dimensional graphics commands can include any of the following: vertex buffers; index buffers; textures; and surfaces. Vertex buffers are buffers that contain information about the vertices associated with a particular aspect of the resultant three-dimensional image. In some embodiments, the vertex buffer can include a structure for each vertex that includes any of the following information: three-dimensional coordinates; depth coordinates; texture mapping coordinates; color; and any other characteristic of a vertex able to be stored in the vertex buffer. Index buffers are another type of buffer that includes indices into vertex buffers. Textures and surfaces are representative of photographic or synthetic two-dimensional raster data.

In some embodiments, the portion of the three-dimensional graphics commands that is encoded is a portion that corresponds to a particular structure. For example, one portion could include all vertices, another portion could include all indices, and still another portion could include all textures and surfaces. This example is illustrative of the different portion segments that could be created, in other embodiments these segments may be numbered or may include multiple structures such as a portion containing both vertices and indices. Once a portion of the three-dimensional graphics commands is identified, that portion is encoded with any of the following types of codecs: Huffman encoding; adler-16, adler-32; CRC-16; CRC-32; Fletcher-16; Fletcher-32; photographic lossy codecs; synthetic lossy codecs; JPEG; HD Photo; 2DRLE; PNG; HD Photo; and any other encoding suitable for the structure being encoded. In one embodiment, vertices and indices are encoded using Huffman encoding, while textures and surfaces would be encoded use either JPEG, HD Photo, 2DRLE, PNG, or HD Photo.

In one embodiment, once the portion of the three-dimensional graphics commands has been encoded, a frame is created (step 606) that comprises each encoded portion of the three-dimensional graphics commands. These encoded portions can in some embodiments be any of the structures described herein encoded using any of the codecs described herein. For example, the three-dimensional graphics commands could include each of a vertex buffer, an index buffer and textures. In one embodiment, the frame could include vertices encoded using Huffman encoding, indices encoded using Huffman encoding, and textures encoded using a synthetic lossy codec. The frame, in some embodiments, comprises the elements of three-dimensional drawing commands; a render state; and resources needed to render or draw a two-dimensional graphical representation or a two-dimensional surface render target that represents the projection of three-dimensional onto a portion of a two-dimensional plane or drawing surface.

Once the frame is created, the agent may in some embodiments compress the frame (step 608) prior to transmission. In some embodiments, a compressor may compress the frame, while in other embodiments, the frame may be compressed after being put through a compression algorithm. Still other embodiments include transmitting a frame that has not been compressed, or transmitting a frame having a portion of compressed data and a portion of non-compressed data.

The local computing machine or server transmits the compressed frame to the remote computing machine or client (step 610) so that a rendering agent, application, or unit may render three-dimensional data from the graphical data contained within the frame. In some embodiments, the frame may be de-compressed prior to rendering.

Figure 5B:
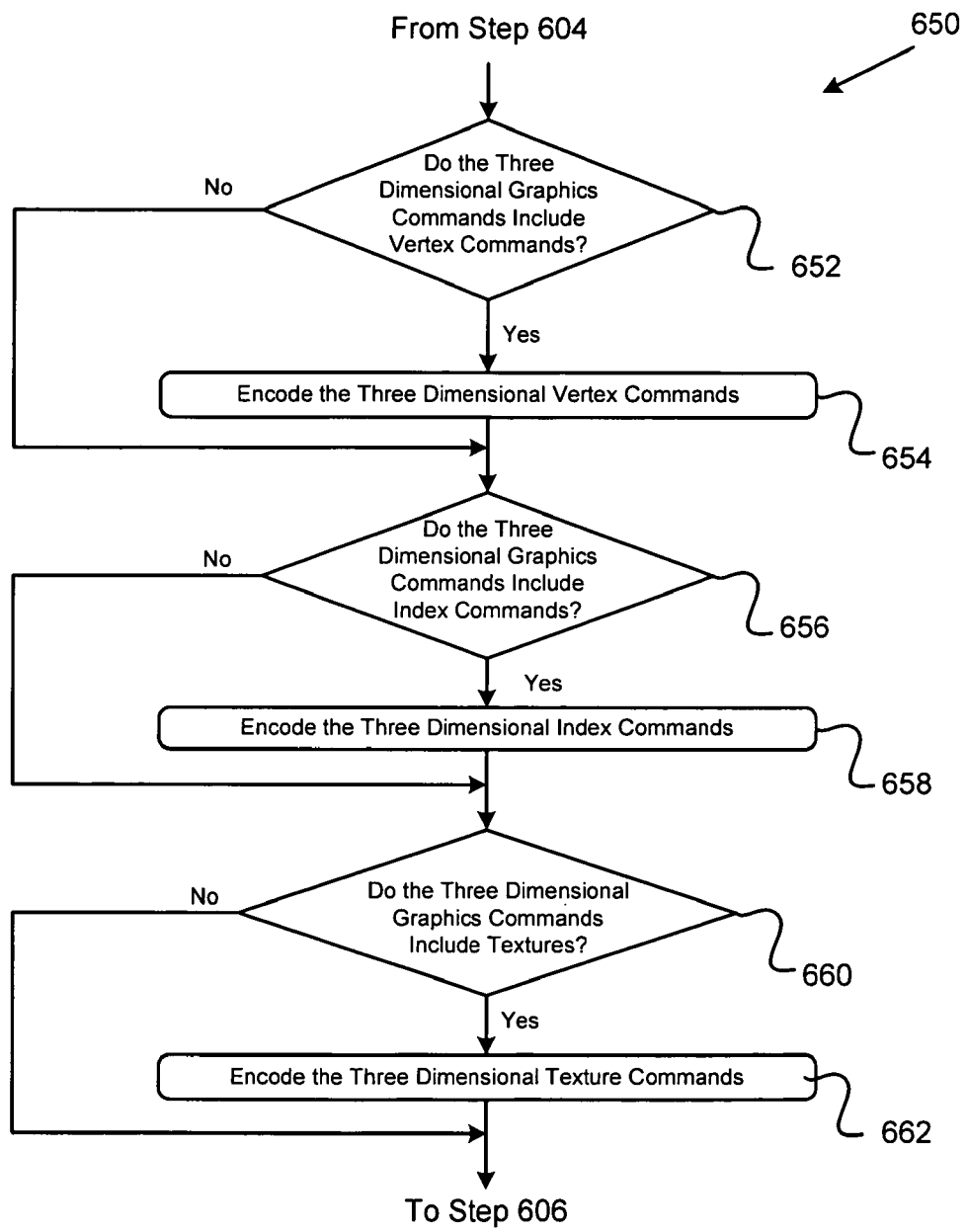

Illustrated in FIG. 5B is an embodiment of a method 650 for encoding portions of graphical commands as indicated in step 604 of the method 600 described in FIG. 5A. The method 650 commences once the method 600 enters step 604, by determining where the three-dimensional graphics commands include vertex commands (step 652). If the three-dimensional data does contain three-dimensional graphics commands that include vertex commands, then the portion of the three-dimensional data corresponding to the vertex commands is encoded with a codec (step 654). A determination is then made as to whether the three-dimensional graphics commands include index commands (step 656). If the three-dimensional data does contain three-dimensional graphics commands that include index commands, then the portion of the three-dimensional data corresponding to the index commands is encoded with a codec (step 658). A determination is then made as to whether the three-dimensional graphics commands include textures or surfaces (step 660). If the three-dimensional data does contain three-dimensional graphics commands that include textures or surfaces, then the portion of the three-dimensional data corresponding to the textures or surfaces is encoded with a codec (step 662).

Further referring to FIG. 5B, and in more detail, method 650 is a sub-process, sub-function or sub-method of method 600 described in FIG. 5A. The method 650, in one embodiment, parses through the three dimensional graphics commands to determine whether different types of commands are included in the three dimensional graphics command set. Method 600 is redirected to the method 650 described in FIG. 5B, and when the method 650 in FIG. 5B has finished executing, method 600 picks up where it left off. Alternatively, the method 650 described in FIG. 5B could be a part of step 604 described in FIG. 5A.

Figure 6A:
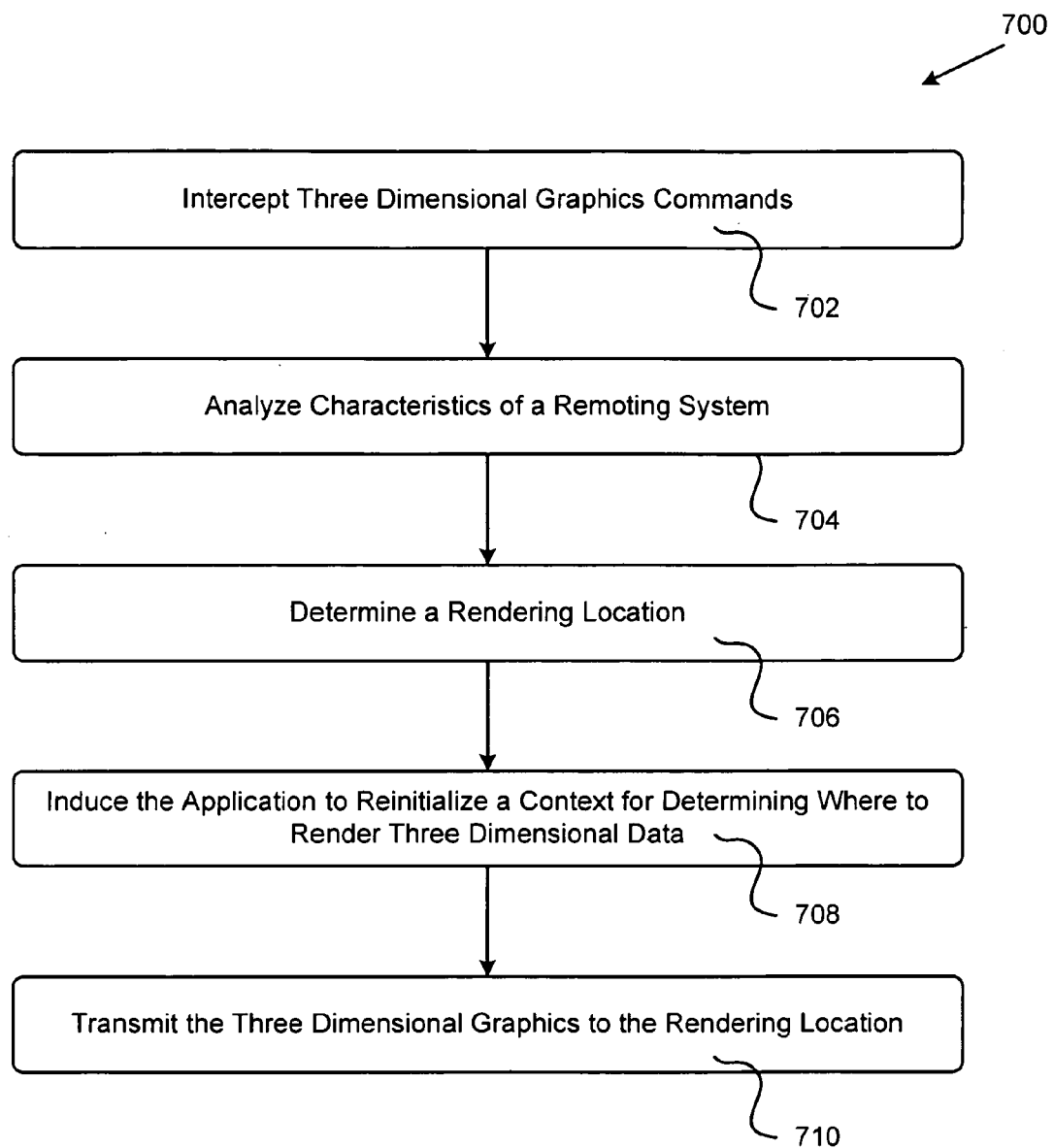
FIGS. 6A-6B are flow diagrams illustrative of embodiments of methods for rendering three-dimensional graphical data.

Illustrated in FIG. 6A is an embodiment of a method 700 for determining where to render three-dimensional graphical data. An agent or system object intercepts three-dimensional graphics commands (step 702) generated by an application using three-dimensional graphics. Before rendering or transmitting the intercepted commands, the characteristics of the remoting system are analyzed (step 704) to determine a rendering location (706). Upon determining a rendering location (706), the agent or system object induces the application to reinitialize a context for determining where to render three-dimensional data (step 708). Once the application has identified the determined rendering location as the location for rendering, the agent or system object transmits the three-dimensional graphics commands the rendering location for rendering (step 710).

Further referring to FIG. 6A, and in more detail, the method 700 for determining where to render the three-dimensional data can be carried out by an agent executing on a server or local computing machine. Alternatively, the method can be carried out by a set of commands, or program executing on a server or local computing machine and taking as input the three-dimensional graphic command output from the application. Still other embodiments can include a rendering manager, a rendering agent, or some other virtual object able to analyze system resources and determine where to render three-dimensional data.

In one embodiment the three-dimensional graphics commands are intercepted by the remoting agent (702), or any other embodiment of an entity that intercepts three-dimensional graphics commands. Intercepting the graphics commands can be accomplished, in some embodiments, by hooking into a call made by the desktop windows manager.

After intercepting the three-dimensional graphics commands, the characteristics of the remoting system are analyzed (704). The remoting system can include any of the following components: one or more client computing devices such as those described herein; one or more servers such as those described herein; a server farm; one or more appliances such as those described herein; and networks over which each of these component communicate and transmit data. In one embodiment, the network(s) used within the remoting system can be any of the networks described herein. Further embodiments include at least one server executing an application, and at least one client computing machine accessing the server to receive graphical data representative of the application's output. In such an embodiment, communication between the client and the server could be facilitated by a remote access protocol. Characteristics of this system can include in some embodiments: the type and/or speed of the graphics processing unit included on the server; the type and/or speed of the graphics processing unit included on the client computing device; the type and/or speed of the central processing unit included on the server; the type and/or speed of the central processing unit included on the client computing device; the application executing on the server; the load on the server; the load on the client computing device; the load on the network; the amount of available bandwidth over which to transmit the three-dimensional graphics commands; a predetermined setting indicative in part of where to render the three-dimensional data; the number of applications on the server rendering three-dimensional data; the lack of a graphics processing unit on either the server or the client computing device; and any other characteristic which may be used to determine a rendering location. In one embodiment, various characteristics are aggregated to produce a single number for each of the rendering locations, such that the rendering location can be chosen by comparing the numbers to see either which number is the highest compared to the others, or which number is the lowest compared to the other numbers. Still other embodiments include weighting various characteristics according to their tax on the system and choosing where to render based on the remoting location that costs the least amount of resources.

The results generated during the analysis of the characteristics of the remoting system are used, in some embodiments, to determine a rendering location (step 706). In one embodiment, the remoting location can be on either the server or the client computing machine. If the rendering location is the server, then the server renders the three-dimensional data from the three-dimensional graphics commands and transmits the rendered graphical data to the client computing machine. If the rendering location is on the client, then the server transmits the three-dimensional graphics commands to the client such that the client receives the commands and renders three-dimensional data from them. Other embodiments include a remoting location that can either be a graphical processing unit on the server or client that is a hardware component, or a graphical processing unit on the server or client that is a software component. Should the result of the analysis of the characteristics of the remoting system demonstrate that rendering the data on a software graphical processing unit would be best, then the remoting location can be a location having a software-based graphical processing unit.

In one embodiment, the agent induces the application to reinitialize its context for determining where to render the three-dimensional data (step 708) by reporting to the application a device state removed. In other embodiments, the agent may report to the application a device state lost. When the application is notified that the device was removed, the application can in some embodiments re-determine where to render data. In one embodiment, the agent can take advantage of this re-determination or the reinitialization of a context for determining where to render three-dimensional data, by telling the application that it should render the three-dimensional data in a particular location. Some embodiments consist of telling the application that it should render the three-dimensional data at the determined rendering location.

Once the application is re-configured to render to the rendering location, the three-dimensional graphics are sent to the rendering location to be rendered.

Figure 6B:
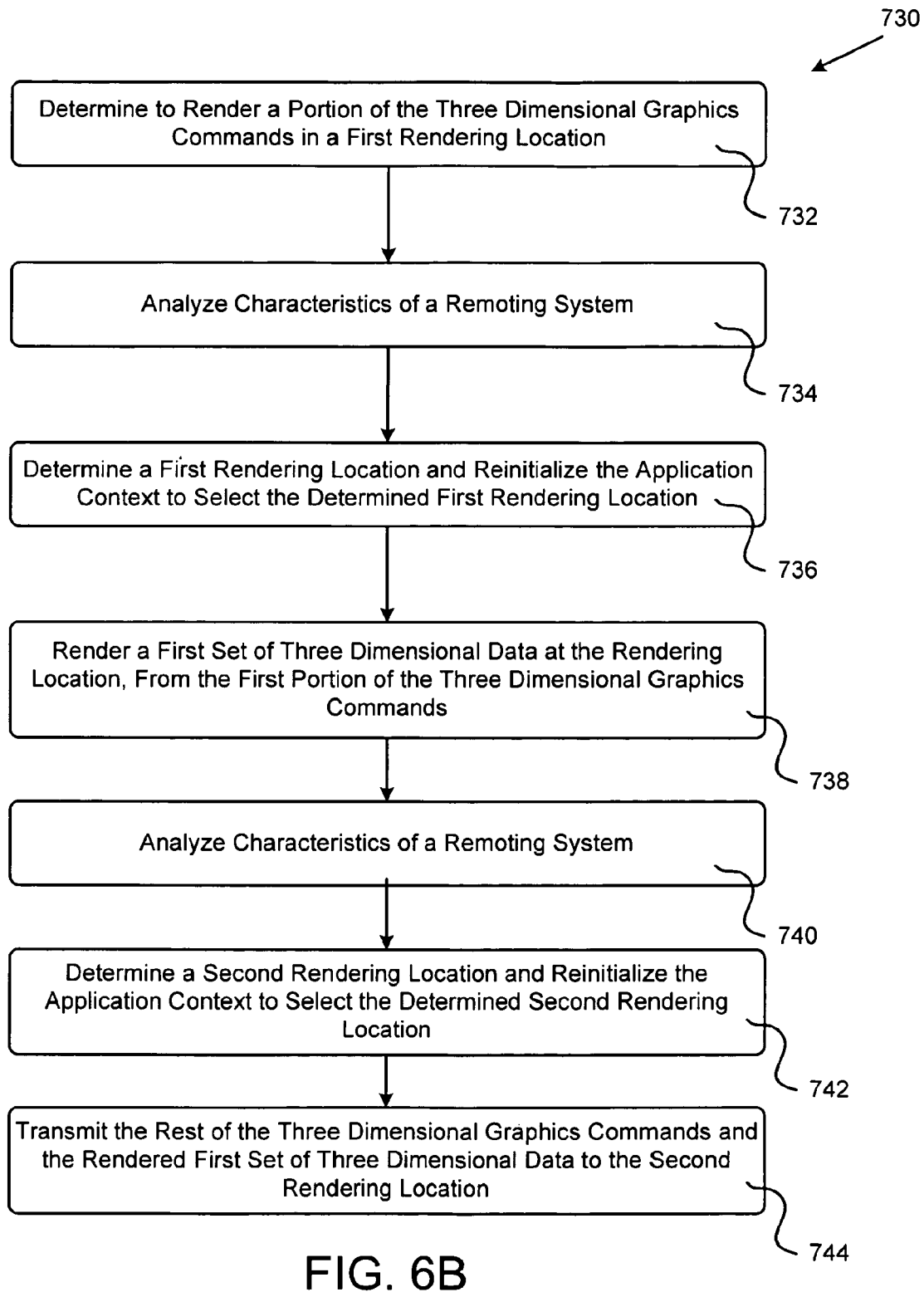

Illustrated in FIG. 6B is a method 730 for rendering three-dimensional graphics commands at a particular location. In one embodiment, the method 730 includes determining to render a portion of three-dimensional graphics commands in a first rendering location (step 732), analyzing the characteristics of a remoting system (step 734) and determining a first rendering location and reinitializing the application context to select the determined first rendering location (step 736). The first set of three-dimensional data is then rendered, at the rendering location from the first portion of the three-dimensional graphics commands (step 738). The characteristics of the remoting system are then re-evaluated (step 740), a second rendering location, is determined and the application context is reinitialized to identify a second rendering location as the location where the data will be rendered (742). Once the second rendering location is determined, the three-dimensional graphics commands and the rendered first set of three-dimensional data are transmitted to the second rendering location (step 744).

Further referring to FIG. 6B and in more detail, in one embodiment, the method 730 comprises determining to render a portion of the three-dimensional graphics commands (step 732). This portion can in some embodiments, be determined based on any of the following factors: type of graphic element (i.e. vertices, indices, textures); size of the graphical data; a transaction; or any other means by which to segment the three-dimensional graphics commands. In one embodiment, each transaction creates a new portion of three-dimensional graphics commands such that a determination as to where to render the graphics commands must be made each time a transaction takes place.

In one embodiment, a portion of the three-dimensional graphics commands is rendered and the resulting rendered graphical data remains on the server. In such an embodiment, a second portion of three-dimensional graphics commands is identified and a new determination is made as to where to render the second portion of three-dimensional graphics commands. In one embodiment, the method includes determining to render a portion of the three dimensional graphics in a first rendering location (step 732). Some embodiments may include adhering to a policy engine which may dictate that certain types of graphics, graphics primitives, or three dimensional graphics types should always be rendered in a particular location whether that be on a local computing machine, a remote computing machine, the network or a third computing machine. In other embodiments, a rendering agent may determine that certain types of graphics, graphics primitives, or three dimensional graphics types should be rendered in a particular location either because of their size, or for other reasons. For example, the rendering agent may specify that certain three dimensional graphics be rendered on the local computing machine because those types of graphics can only be rendered by the graphics processing unit included on the local computing machine. In such an example, the graphics would be rendered on the local computing machine and the rendered graphics or bitmaps would be sent to a client machine or to any other remote computing machine. Should the three dimensional graphics be included within a graphics scheme including graphics commands that a remote computing machine could render, the rendering agent may determine to transmit a graphics package to the remote computing machine, that includes the three dimensional graphics already rendered by the server and the graphics commands. The remote computing machine could then render the graphics commands at the remote computing machine.

Figure 7:
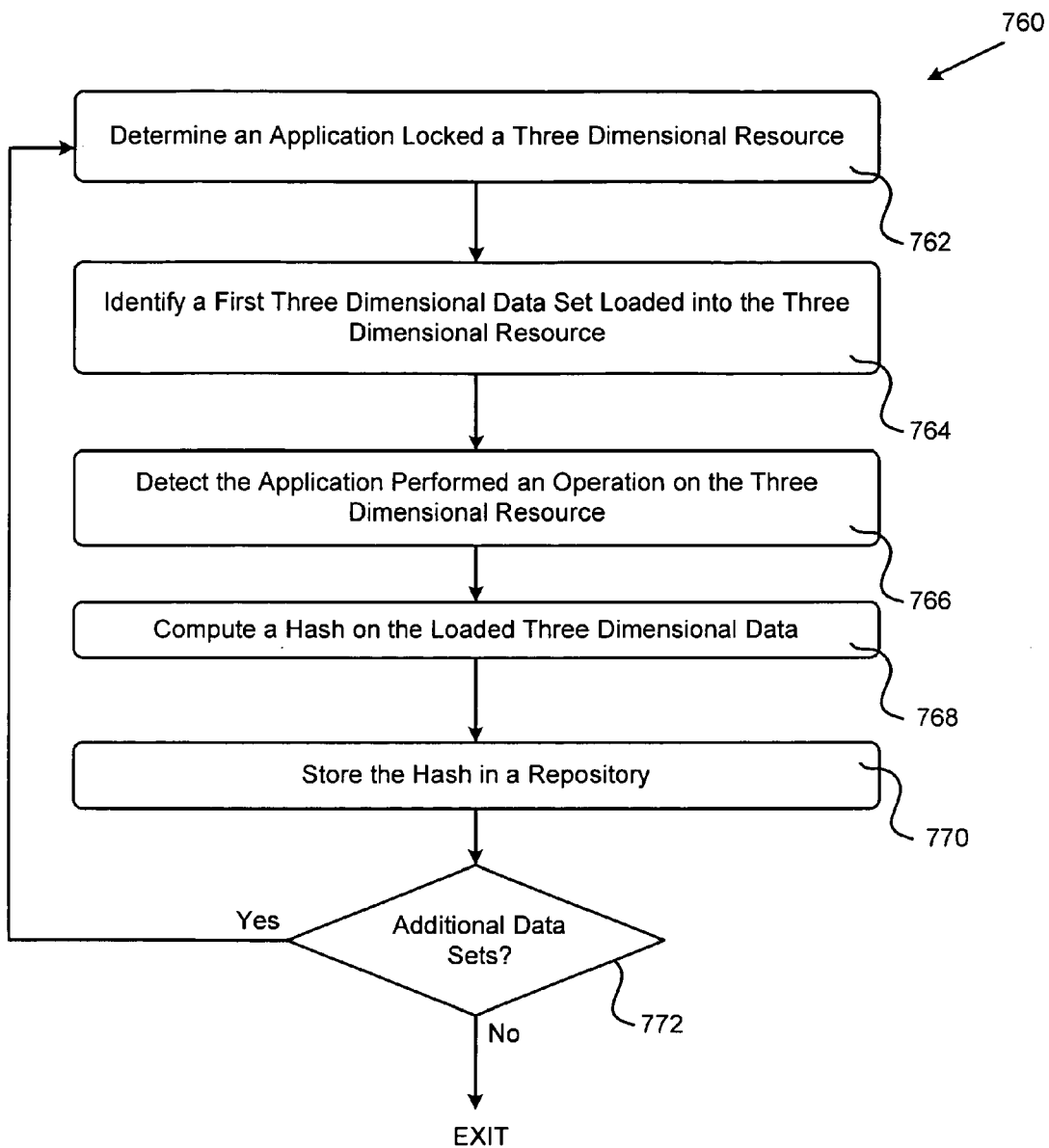
FIG. 7 is a flow diagram illustrative of an embodiment of a method for computing a hash of three-dimensional graphical data.

Illustrated in FIG. 7 is a flow diagram that illustrates an embodiment for method 760 of computing and caching a hash from a three-dimensional data set. Computing and caching the hash may include a determination of whether a three-dimensional resource has been locked by an application (step 762). An identification is made of a first three-dimensional data set loaded into the three-dimensional resource (step 764). The method 760 may further include detecting if the application performed an operation on the three-dimensional resource (step 766). A hash is computed on the loaded three-dimensional data (step 768), and the hash is stored in a repository (step 770). A determination is then made as to whether there are additional data sets (step 772), thereby causing the method 760 to either repeat or terminate.

Further referring to FIG. 7 and in more detail, the method 760 may include determining whether an application has locked a three-dimensional resource (step 762). In some embodiments, the three-dimensional resource may include vertices, indices, shaders, textures, surfaces, or any other similar three-dimensional data type. An application may lock a three-dimensional resource while modifying data within the source or loading data into the resource in order to prevent processes from reading the changing resource. In some embodiments, the determination that an application has locked a three-dimensional resource may be made by examining flags, counters, synchronization monitors, or queues for the data, or any other method that allows a process to determine that a resource has been locked for writing. In further embodiments, the three-dimensional resource locked by the application may be one used by the application, while in other embodiments, the application may lock a three-dimensional resource used by another application. The three dimensional resource can, in some embodiments, be any one of the following types of resources: the driver for a graphics processing unit; or any other resource used in conjunction with a graphics processing unit or graphics processing algorithm, set of instructions or software.

The method 760 may further include a step of identifying a three-dimensional data set loaded into the three-dimensional resource (step 764). The three-dimensional data set may be a first three-dimensional data set or may be a second three-dimensional data set, a third three-dimensional data set, or any further data set depending on the number of data sets loaded into the three-dimensional resource. In some embodiments, the three-dimensional data sets may have variable sizes, while in other embodiments, any or all of them may have substantially similar sizes. The sizes of each data set may, in some embodiments, be determined at least in part by a transaction carried out by the application. In some embodiments, the transaction may comprise copying data into the three-dimensional resource. In further embodiments, the transaction may have an end event unlocking the three-dimensional resource, the end event thus can indirectly determine the size of the data set. In other embodiments, the transaction may have both a start event and an end event, and the data set size may be determined by the length of time between the start event and end event. In such embodiments, the start event may comprise locking the three-dimensional resource, and/or the end event may comprise unlocking the three-dimensional resource.

In one embodiment, the method 760 includes detecting that the application performed an operation on the three-dimensional resource (step 764). This may include detecting that an application has locked or unlocked a three-dimensional resource by examining or identifying flags, counters, synchronization monitors, or queues, or any other method that allows a process to determine that a resource has been locked or unlocked for writing. In some embodiments, detection that an operation has been performed on the three-dimensional resource may be made merely by observing that the three-dimensional resource has been unlocked after a period of being locked. In other embodiments, the application may be monitored to determine what operations have been performed.

In one embodiment, the method 760 includes a step of computing a hash on the loaded three-dimensional data (step 768). The hash function performed may be any hash function or checksum algorithm that has sufficiently few collisions for the type of data used, such as adler-16, adler-32, CRC-16, CRC-32, Fletcher-16, Fletcher-32, or any other CRC or non-CRC hash function, or a hash function that produces minimal or substantially no collisions for the type of data on which the hash function is applied; or any other hash function able to produce results suitable for the systems and methods described herein.

In one embodiment, the method 760 includes a step of storing the hash in a repository (step 770). In some embodiments, the repository may be a buffer, a cache, a data store, a flat file, or any other format, and may be implemented in RAM, flash memory, a hard disk, or any other storage medium. In some embodiments, the repository may stored on a local computing device, while in other embodiments, the repository may reside on a second computing device, accessible over a network. In further embodiments, the repository may be purged by using an aging algorithm. The aging algorithm may be any page replacement algorithm, such as Least Recently Used (LRU), Not Recently Used (NRU), Active Replacement Cache (ARC), First-in, First-out (FIFO), Least Frequency Usage (LFU), or any similar algorithm that allows the repository to evict entries on an efficient basis.

In one embodiment, the method 760 includes a determination of whether additional data sets exist in the three-dimensional resource (step 772). If such a determination is made, then method 760 will further include identifying further three-dimensional data sets loaded into the three-dimensional resource, detecting further operations performed by the application to the three-dimensional resource, computing hashes of the further three-dimensional data sets, and storing the hashes of the further three-dimensional data sets within the repository.

In one embodiment, the method 760 may further include eliminating a portion of the first three dimensional data set in response to detecting that the application performed an operation. The portion of the three dimensional data set that may be a result of a repetitious transaction. In other embodiments, the computing machine only maintains and stores computed hashes and drives a remote computing machine cache by determining which data to throw out to make room for new data on a miss and maintain an overall max size. Determining which data to throw out can be based in part on an aging algorithm such as a Least Frequency Usage algorithm. Such an algorithm increments a counter on a hit and when space is needed on a miss, the entries that have the lowest counter and size that produces the least impact to bandwidth are evicted. Further embodiments can include a caching system where there is persistent caching of high frequency resources on a client, computing machine or remote computing machine's persistent storage disk. Thus, in such an embodiment, textures and surfaces that are loaded during an initial setup during an application's start-up or new scene are loaded more quickly so that the application restarts more quickly than if there was no persistent caching of high frequency resources. Further, the use of high frequency dynamic data can be more efficient because hashes of the dynamic data can be cached and saved by a client, computing machine or remote computing machine when an application terminates.

In other embodiments, the application can transfer, move, copy, load, or otherwise cause data to be put into the three dimensional resource. Still other embodiments include an application that transfers data to an intermediary application configured to load, copy or transfer the data into the three dimensional resource. In such an embodiment, the intermediary application can exist on the same computing device as the application, a computing device remote from the computing device on which the application executes, or any other virtual or physical computing device or appliance in communication with the computing device on which the application executes.

In one embodiment, the method 760 is repeated only when an application or agent detects that the three dimensional resource is being used by any application, or in other embodiments, by a particular application. Other embodiments include repeating the method 350 only when an application or agent detects that the three dimensional resource has had data copied or loaded into it, and the three dimensional resource has or is being used by an application. In yet another embodiment, the method 760 is repeated only when it is determined that data different from previously cached data is loaded or copied into the three dimensional resource. Other embodiments include repeating the method 760 only when a particular sequence of actions is detected, e.g. lock the three dimensional resource, load or copy data into the three dimensional resource; and use the three dimensional resource. Still more embodiments can include a method 760 that is periodically repeated.

Figure 8A:
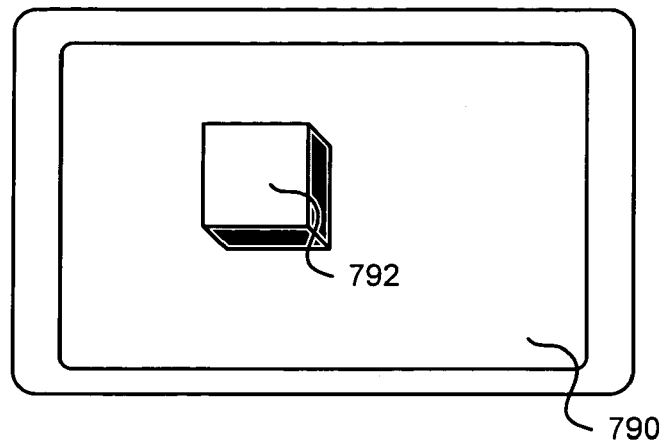
FIGS. 8A-8B are block diagrams of a screen displaying an embodiment of a three-dimensional image and the viewport set when that three-dimensional image is changed.
Figure 8B:
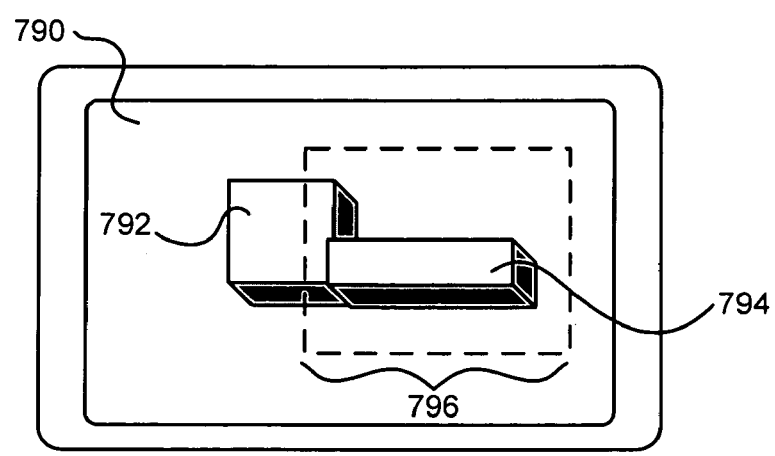

Illustrated in FIGS. 8A and 8B are embodiments of screenshots of a method for detecting a drawing region within a frame. A frame 790 may contain a first three-dimensional FIG. 792 in a first presented bitmap in FIG. 8A. In a second presented bitmap in FIG. 8B, the frame 790 contains the first three-dimensional FIG. 792, and a second three-dimensional FIG. 794. The second three-dimensional FIG. 794 is within a region 796 that is a subset of the frame 790.

Referring to FIG. 8A and in more detail, the frame 790 may also be referred to as a scene, a default viewport, a canvas, an image, a bitmap, a screen, a surface, or any other descriptive term for a displayed three-dimensional graphic. Within the frame 790 may be a first three-dimensional FIG. 792. The first three-dimensional FIG. 792 may include vertices, indices, shaders, textures, surfaces, or any other similar three-dimensional data type. In some embodiments, the first three-dimensional FIG. 792 may not exist and the frame 790 may be empty. In other embodiments, the first three-dimensional FIG. 792 may be accompanied by other three-dimensional figures, not illustrated.

Referring to FIG. 8B and in more detail, in one embodiment, a second three-dimensional FIG. 794 is added to the frame 790. In some embodiments, multiple three-dimensional figures, not illustrated, may be added simultaneously. In other embodiments, the second three-dimensional FIG. 794 may be have been present in the previously presented frame 790, and may be removed. In still other embodiments, multiple figures, including the second three-dimensional FIG. 794, the first three-dimensional FIG. 792, and other three-dimensional figures not illustrated may be removed, added, or modified.

In one embodiment, the second three-dimensional FIG. 794 is contained within a sub-region 796 of the frame 790. In the illustrated example, the portion of frame 790 outside of the region 796 does not change from the previously presented bitmap in FIG. 8A to the newly presented bitmap in FIG. 8B. The region 796 may be referred to as a drawing region, a viewport, a canvas or canvas portion, a screen section, a section of the frame, a view-clipping region, a view-clipping rectangle, or any other term that is descriptive of a sub-portion of the frame 790. In some embodiments, multiple three-dimensional figures may be added to the newly presented bitmap, and they may be grouped within multiple non-contiguous regions (not illustrated). In other embodiments, multiple figures may be grouped within a single region. The region 796 may also, in some embodiments, represent a sub-portion of the frame 790 where a three-dimensional figure or figures have been removed or modified. In some embodiments, the region 796 may be designated by a function call, such as the SetViewPort method of the DIRECT3D API developed by the Microsoft Corporation, or the glViewport method of the Open Graphics Library API (OPENGL), developed by Silicon Graphics, Inc., or any similar method or function call that may define a region or sub-region of the frame 790 of a render target.

Figure 9:
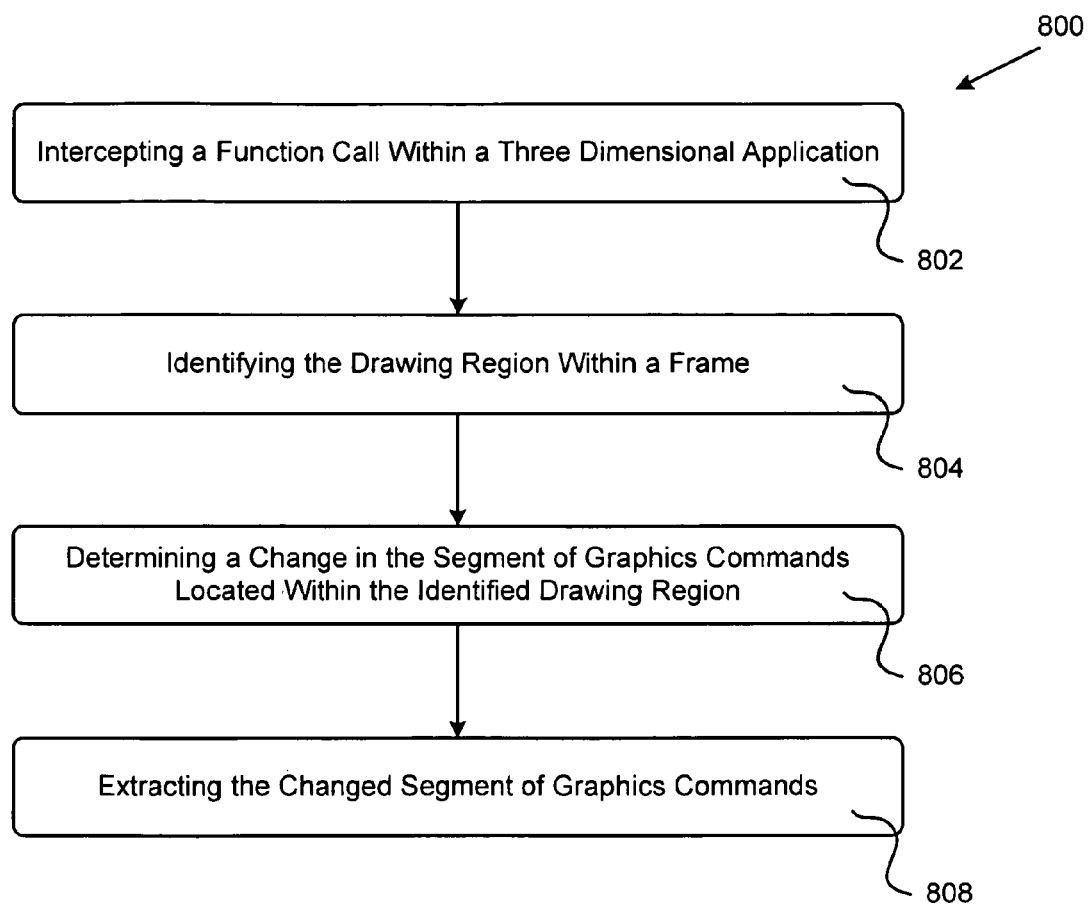
FIG. 9 is a flow diagram of an embodiment of a method for detecting dirty regions generated by an application outputting three-dimensional graphics commands.

Illustrated in FIG. 9 is a method 800 for detecting a dirty region within a frame. Detecting a dirty region may include intercepting a function call generated by a three-dimensional application (step 802). The intercepted function call may be used at least in part to identify a drawing region within a frame (step 804). A determination may be made that at least a portion of the graphics commands associated with the identified drawing region have changed (step 806). The changed portion of the graphics commands within the identified drawing region are then extracted (step 808).

Further referring to FIG. 9 and in more detail, the method 800 may include a step of intercepting a function call generated by a three-dimensional application (step 802). Intercepting a function call may also be referred to as hooking, monitoring, listening, capturing, or any other term descriptive of a third process receiving a copy of a communication between a first and second process. In some embodiments, the intercepting may be performed via an agent executing on a local machine. In other embodiments, the intercepting may be performed by a sub-routine, function, daemon, service, or application having the ability to intercept communications between a three-dimensional application and a three-dimensional rendering engine, which may comprise hardware or software for processing three-dimensional graphics commands. In some embodiments, the function call intercepted may be a function call that causes the contents of a back buffer to be presented to a display device. In these embodiments, the function call can indicate that drawing or rendering has completed and that no more changes will be made to the contents prior to presentation. In some embodiments, intercepting the function call may further comprise intercepting a call representing a particular drawing region, such as the SetViewPort method of the DIRECT3D API referred to above. In such embodiments, the function call may have data strings, variables, or other identifiers designating a rectangle or other region of a rendering target. The designation of a region may indicate that a modification of three-dimensional graphics and graphics primitives may imminently occur within the region, herein referred to as a dirty region.

In one embodiment, the intercepted function call is used to identify the designated drawing region (step 804). In some embodiments, the identification may be performed by the same agent, function, or service responsible for intercepting the function call, and may be performed by parsing or analyzing the intercepted function call for a designation of a region within a frame. In some embodiments, the function call may include values designating a corner of a region and other values designating a width and height of the region. These values may be extracted to determine the location and size of the region. In other embodiments, the function call may include values that may be utilized to determine the location, size, and shape of the region. In still other embodiments, the function call may lack values that designate a region, but may be accompanied by other function calls that do designate a region or regions. In some embodiments, a further determination may be made as to whether a designated region is in the back buffer that will be imminently presented to the display device. In such embodiments and responsive to the determination, a region may be excluded from the identified dirty regions if it is not within the back buffer. For example, a region designated by a function call may be used as a render target for textures and surfaces that are used to render the back buffer, but may themselves not be part of the back buffer. In such a case, the region may be excluded from the identified dirty regions so that the identified dirty regions only apply directly to the back buffer rather than indirectly.

In one embodiment, a determination is made (step 806) that a change has occurred to at least a portion of the graphics commands associated with the dirty region or regions in the time since a previous intercepted function call. In some embodiments, this determination may be made by parsing or analyzing the contents of the identified dirty region or regions for three-dimensional graphics commands. In other embodiments, the determination could be merely made responsive to a region being identified in a function call, such as the SetViewPort method referred to above, or any similar function call for designating a region of a frame for drawing or rendering changes.

In one embodiment, the changed three-dimensional graphics commands within the dirty region or regions are extracted (step 808). In some embodiments, this may be a subset of the graphics commands within the entire frame, some which have not been changed in the time since a previous intercepted function call. In other embodiments, the entire frame may be changed, while in still other embodiments, no changes will occur within the frame.

Figure 10:
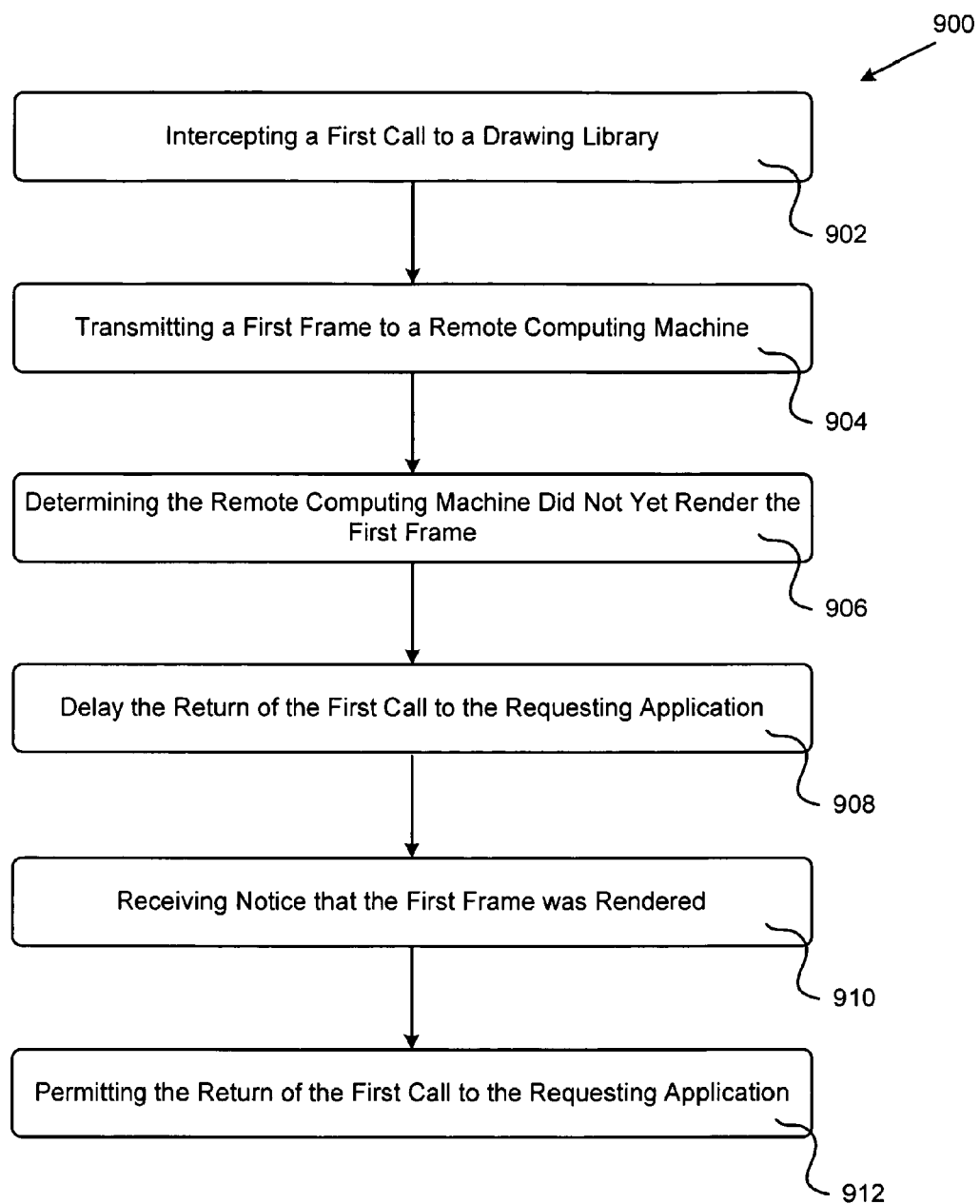
FIG. 10 is a flow diagram of an embodiment for improving resource utilization.

Illustrated in FIG. 10 is one embodiment of a method 900 for delaying the presentation of a back buffer surface to, in some cases, improve resource utilization. In this method 900, an agent intercepts a first call to a drawing library (step 902). A first frame is then transmitted to a remote computing device (904), and a determination is made as to whether the remote computing rendered the first frame (step 906). The transmission of a return message in response to the first call is then delayed (step 908) until a notification is received that the first frame was transmitted or rendered (step 910). Upon receiving this notice, permission is granted to return the first call to the requesting application (step 912).

Further referring to FIG. 10, and in more detail, in one embodiment all the steps of the method 900 may be carried out by an agent executing on a computing machine. Still other embodiments include an agent executing on any one of a local computing machine, a remote computing machine, a third computing machine, within a distributed computing system, on a network, on an appliance, or on any machine able to execute the agent. Still other embodiments include carrying out the method 900 in a distributed computing environment or system, where the distributed computing environment can include any combination of client computing device(s), server(s), appliance(s), three-dimensional applications, or network(s). In one embodiment, the method 900 can execute in a distributed computing environment including a local computing device executing the agent and an application, where the local computing device communicates with and is connected to a remote computing device within the distributed computing environment. Still other embodiments include a drawing library on any computing machine able to execute the agent, where the drawing library can be any of the above-described three-dimensional graphics libraries such as for example the DirectX or OpenGL libraries.

In one embodiment, an agent executing on the local computing machine intercepts a first call to a drawing library to further request information from the drawing library (step 902). The first call is in some embodiments generated by an application executing on a computing machine, and in other embodiments, is a call generated by an application executing on a local computing machine or server. Some embodiments include a first call that is a first present call requesting to exchange a currently displayed image with an image to be rendered from the first frame. In this embodiment, a hook may be installed in the drawing library to prevent calls from returning to the requesting application. This can be done to control any one of how many frames are rendered and when frames are rendered on the local computing machine. When, in this embodiment, the application requests graphical data or information, or graphics primitives from the drawing library, the drawing library can return a rendered image. Thus, the return call is a return message generated by the drawing library that can include a rendered image.

Still other embodiments include a method 900 where the agent transmits the first frame to a remote computing machine (step 904). There exist embodiments where the agent transmits a plurality of frames as opposed to a first frame. In one embodiment, the agent which intercepts the first call is the substantially same agent that transmits the first frame to a remote computing machine or device, while in other embodiments, the agent that intercepts the first call is a substantially different agent than the agent which transmits the first frame. The first frame, in some embodiments, can comprise any combination of three-dimensional graphics commands, rendered images, rendered three-dimensional images, graphics primitives, and graphics libraries.

The agent, in one embodiment, determines the remote computing machine did not yet render the first frame (step 906). In one embodiment, a determination as to whether the remote computing machine has rendered the transmitted first frame can be made by identifying whether the remote computing machine transmitted a confirmation to the local computing machine indicating that the first frame was rendered at the remote computing machine. Other embodiments include determining whether the remote computing machine has rendered the transmitted first frame by listening to the network stack, and hearing from the network stack that the network is not busy. Still other embodiments include sending test packets over the network to determine whether the network is busy, failing to receive a confirmation test packet, and determining that the network is busy therefore the first frame has not yet been fully received by the remote computing device. A determination can be made, in some embodiments, by analyzing the load placed on a network in between the local computing machine and the remote computing machine to determine whether the load has exceeded or fallen short of a predetermined threshold. When the load has exceeded the predetermined threshold, a determination can be made that the network is busy; while when the load has fallen short of the predetermined threshold, a determination can be made that the network is not busy and therefore the first frame has likely finished transmitting to the remote computing machine and therefore is likely rendered.

In one embodiment, the return call to the requesting application is delayed by the agent (step 908). Other embodiments include preventing to return the first call to the requesting application when it is determined that any one of the agent, local computing machine, or application failed to receive a notification indicating that the first frame was rendered. The agent can, in some embodiments, delay the presentation of the drawing by preventing the drawing library or an executable module in the drawing library from returning the first call to the requesting application along with the rendered graphics. When, in some embodiments, a graphic is rendered by the drawing library, such rendering can take place on a back buffer that stores off screen graphics. In embodiments where the agent delays or prevents a return of the first call to the requesting application, the agent can be further delaying or preventing the display or transmission of the contents of the back buffer to the requesting application. Still other embodiments include preventing the return of the first call and accompanying graphics for a predetermined period of time, where such a period of time can be determined empirically, randomly, dynamically, or can be hard coded into the agent by a user or application. In another embodiment, the return of the first call may occur when a notification is received that indicates the first frame was rendered, and after a predetermined period of time.

Some embodiments include an agent that receives a notification that the first frame was rendered on the remote computing machine (step 910), and responsively permits the return of the first call to the requesting application (step 912). In one embodiment, the notification is generated by the remote computing machine, while in other embodiments the notification can be generated by any one of the network, an application executing on the local computing machine, or an application executing on the remote computing machine.

In one embodiment, method 900 includes an agent that either is a remoting mechanism or that interfaces with a remoting mechanism used to transmit graphics to a remote computing machine. This method 900 can, in some embodiments, delay rendering frames or graphical data by rendering after a determination is made that the previous frame was successfully transferred to the remote computing device, or alternatively successfully rendered at the remote computing device. In another embodiment, after the agent permits a return of the first call to the requesting application, the agent transmits a second frame generated by the application. In this embodiment, the agent receives a notification that indicates the second frame was rendered, and intercepts a second call generated by the application requesting information from the drawing library. The agent can then identify an indicator that the second frame was rendered and the agent can permit the second call to return to the requesting application. In one embodiment, the agent can decide not to block a present call issued by the application when the agent determines that a flag has been received indicating that the previous frame was received or displayed at the remote computing machine. Thus, in this embodiment, the present call may not be blocked and may return to the requesting application.

The present disclosure may be provided as one or more computer-readable programs embodied on or in one or more articles of manufacture. The article of manufacture may be a floppy disk, a hard disk, a compact disc, a digital versatile disc, a flash memory card, a PROM, a RAM, a ROM, a computer readable medium having instructions executable by a processor, or a magnetic tape. In general, the computer-readable programs may be implemented in any programming language. Some examples of languages that can be used include C, C++, C#, or JAVA. The software programs may be stored on or in one or more articles of manufacture as object code.

While various embodiments of the methods and systems have been described, these embodiments are exemplary and in no way limit the scope of the described methods or systems. Those having skill in the relevant art can effect changes to form and details of the described methods and systems without departing from the broadest scope of the described methods and systems. Thus, the scope of the methods and systems described herein should not be limited by any of the exemplary embodiments and should be defined in accordance with the accompany claims and their equivalents.

What is claimed is:

1. A system for remoting three-dimensional graphics, the system comprising:
   a remote computing machine executing an application that generates a plurality of three-dimensional graphics command that is in communication with a local computing machine via a remote presentation protocol, and further comprises:
   an agent configured to intercept the plurality of three-dimensional graphics commands;
   a rendering application configured to:
      encode a first portion of the plurality of three-dimensional graphics commands with a first codec, the first portion comprising one of vertex three-dimensional graphics commands, index three-dimensional graphics commands, texture three-dimensional graphics commands, and surface three-dimensional graphics commands;
      encode a second portion of the plurality of three-dimensional graphics commands with a second codec;
      create a frame comprising the first portion and the second portion of the plurality of three-dimensional graphics commands compress the frame, and
      transmit the frame to the local computing machine.

2. The system of claim 1, wherein the second portion comprises a different one of vertex three-dimensional graphics commands, index three-dimensional graphics commands, texture three-dimensional graphics commands, and surface three-dimensional graphics commands than the first portion.

3. The system of claim 1, wherein the second portion of the plurality of three-dimensional graphics commands is different from the first portion of the plurality of three-dimensional graphics commands.

4. The system of claim 1, wherein the second portion of the plurality of three-dimensional graphics commands is substantially similar to the first portion of the plurality of three-dimensional graphics commands.

5. The system of claim 1, wherein the agent intercepts the three dimensional graphics commands before they are transmitted to a three dimensional graphics driver.

6. The system of claim 1, wherein the agent forwards the intercepted plurality of three-dimensional graphics commands to the rendering application.

7. The system of claim 1, wherein the frame comprises graphics primitives.

8. The system of claim 7, wherein the graphics primitives include one of DirectX graphics primitives, OpenGL graphics primitives, and Direct3D graphics primitives.

9. A method for remoting three-dimensional graphics, the method comprising:
   intercepting, by an agent, a plurality of three-dimensional graphics commands generated by an application executing on a remote computing machine;
   encoding, by a rendering application, a first portion of the plurality of three-dimensional graphics commands with a first codec, the first portion comprising one of vertex three-dimensional graphics commands, index three-dimensional graphics commands, texture three-dimensional graphics commands, and surface three-dimensional graphics commands;
   encoding, by the rendering application, a second portion of the plurality of three-dimensional graphics commands with a second codec;
   creating, by the rendering application, a frame comprising the first portion and the second portion of the plurality of three-dimensional graphics commands;
   compressing, by the rendering application, the frame; and
   transmitting, by the rendering application, the frame to a local computing machine.

10. The method of claim 9, wherein the second portion comprises a different one of vertex three-dimensional graphics commands, index three-dimensional graphics commands, texture three-dimensional graphics commands, and surface three-dimensional graphics commands than the first portion.

11. The method of claim 9, wherein encoding the second portion of the plurality of three-dimensional graphics commands further comprises encoding a second portion of the plurality of three-dimensional graphics commands different from the first portion of the plurality of three-dimensional graphics commands.

12. The method of claim 9, wherein encoding the second portion of the plurality of three-dimensional graphics commands further comprises encoding a second portion of the plurality of three-dimensional graphics commands substantially similar to the first portion of the plurality of three-dimensional graphics commands.

13. The method of claim 9, wherein intercepting further comprises intercepting the three-dimensional graphics commands before they are transmitted to a three dimensional graphics driver.

14. The method of claim 9, The method of claim 6, further comprising redirecting the three-dimensional graphics commands to a proxy three dimensional graphics driver.

15. The method of claim 9, wherein creating a frame further comprises creating a frame comprising graphics primitives.

16. The method of claim 15, wherein the graphics primitives include one of DirectX graphics primitives, OpenGL graphics primitives, and Direct3D graphics primitives.

17. A non-transitory computer readable medium storing instructions executable by a processor, the instructions when executed cause the processor to:
   intercept a plurality of three-dimensional graphics commands generated by an application executing on a remote computing machine;
   encode a first portion of the plurality of three-dimensional graphics commands with a first codec, the first portion comprising one of vertex three-dimensional graphics commands, index three-dimensional graphics commands, texture three-dimensional graphics commands, and surface three-dimensional graphics commands;
   encode a second portion of the plurality of three-dimensional graphics commands with a second codec;
   create a frame comprising the first portion and the second portion of the plurality of three-dimensional graphics commands;
   compress the frame by the rendering application; and
   transmit the frame to a local computing machine.

18. The non-transitory computer readable medium of claim 17, wherein the second portion of the plurality of three-dimensional graphics commands includes a different one of vertex three-dimensional graphics commands, index three-dimensional graphics commands, texture three-dimensional graphics commands, and surface three-dimensional graphics commands.

* * * * *